United States Patent
Kang et al.

(10) Patent No.: US 10,616,762 B2
(45) Date of Patent: Apr. 7, 2020

(54) METHOD FOR CONTROLLING ACCORDING TO STATE AND ELECTRONIC DEVICE THEREOF

(71) Applicant: Samsung Electronics Co., Ltd., Suwon-si, Gyeonggi-do (KR)

(72) Inventors: Jeong Gwan Kang, Hwaseong-si (KR); Byungjun Lee, Uiwang-si (KR); Kyong-Ha Park, Suwon-si (KR); Hyunsu Hong, Seongnam-si (KR); Yunhwa Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 15/232,142

(22) Filed: Aug. 9, 2016

(65) Prior Publication Data
US 2017/0048706 A1 Feb. 16, 2017

(30) Foreign Application Priority Data

Aug. 11, 2015 (KR) .................. 10-2015-0113098

(51) Int. Cl.
*G06F 1/3287* (2019.01)
*G06F 1/3231* (2019.01)
(Continued)

(52) U.S. Cl.
CPC ............ *H04W 12/06* (2013.01); *G06F 1/163* (2013.01); *G06F 1/1694* (2013.01);
(Continued)

(58) Field of Classification Search
None
See application file for complete search history.

(56) References Cited

U.S. PATENT DOCUMENTS 8,289,162 B2* 10/2012 Mooring ................ G06F 3/017
340/407.1
8,854,925 B1* 10/2014 Lee ....................... G04G 9/0005
368/10
(Continued)

FOREIGN PATENT DOCUMENTS

CN 104052833 A * 9/2014 ............ G06F 3/014
EP 0951883 A2 * 10/1999 ............ G06F 1/163
(Continued)

OTHER PUBLICATIONS

EP Office Action dated Oct. 19, 2018 issued in EP Application No. 16183588.9.

*Primary Examiner* — Kambiz Zand
*Assistant Examiner* — Arezoo Sherkat
(74) *Attorney, Agent, or Firm* — Jefferson IP Law, LLP

(57) ABSTRACT

A method of an electronic device is provided. The method includes obtaining first state information related to a motion of the electronic device by using a first sensor operatively coupled to the electronic device while the electronic device is in a first state, transitioning, if the first state information satisfies a first designated condition, the electronic device from the first state to a second state, obtaining second state information related to at least a part of a user's body corresponding to the electronic device by using a second sensor operatively coupled to the electronic device while the electronic device is in the second state, and transitioning, if the second state information satisfies a second designated condition, the electronic device from the second state to a third state.

19 Claims, 16 Drawing Sheets

(51) Int. Cl.
*G06F 1/16* (2006.01)
*G06F 21/32* (2013.01)
*H04W 52/02* (2009.01)
*G06F 21/31* (2013.01)
*H04W 12/08* (2009.01)
*H04M 1/725* (2006.01)
*H04W 12/06* (2009.01)

(52) U.S. Cl.
CPC .......... *G06F 1/3231* (2013.01); *G06F 1/3287* (2013.01); *G06F 21/316* (2013.01); *G06F 21/32* (2013.01); *H04W 12/08* (2013.01); *H04W 52/0251* (2013.01); *H04M 1/7253* (2013.01); *H04M 1/72572* (2013.01); *H04M 2250/12* (2013.01); *Y02D 10/171* (2018.01); *Y02D 10/173* (2018.01); *Y02D 70/1242* (2018.01); *Y02D 70/1262* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(56) References Cited

U.S. PATENT DOCUMENTS

| | | | |
|---|---|---|---|
| 9,720,389 B2* | 8/2017 | Hong | H04W 52/0277 |
| 2006/0028429 A1* | 2/2006 | Kanevsky | G06F 3/011 |
| | | | 345/156 |
| 2008/0216171 A1 | 9/2008 | Sano et al. | |
| 2008/0291225 A1* | 11/2008 | Arneson | G06F 3/011 |
| | | | 345/698 |
| 2009/0265671 A1* | 10/2009 | Sachs | G06F 3/017 |
| | | | 715/863 |
| 2011/0141276 A1 | 6/2011 | Borghei | |
| 2011/0187681 A1* | 8/2011 | Kim | G06F 1/1652 |
| | | | 345/204 |
| 2012/0154292 A1 | 6/2012 | Zhao et al. | |
| 2012/0235790 A1* | 9/2012 | Zhao | G06F 21/32 |
| | | | 340/5.83 |
| 2012/0326911 A1 | 12/2012 | Niwa et al. | |
| 2013/0093353 A1* | 4/2013 | Park | H05B 33/0815 |
| | | | 315/291 |
| 2014/0156269 A1* | 6/2014 | Lee | G06F 1/3206 |
| | | | 704/231 |
| 2014/0273858 A1* | 9/2014 | Panther | A61B 5/0002 |
| | | | 455/41.2 |
| 2014/0279528 A1 | 9/2014 | Slaby et al. | |
| 2015/0070251 A1 | 3/2015 | Kim et al. | |
| 2015/0092520 A1 | 4/2015 | Robison et al. | |
| 2015/0338926 A1* | 11/2015 | Park | G06F 3/011 |
| | | | 345/156 |
| 2016/0112871 A1* | 4/2016 | White | H04W 12/06 |
| | | | 726/4 |
| 2016/0174025 A1* | 6/2016 | Chaudhri | H04W 4/02 |
| | | | 455/41.1 |
| 2016/0248894 A1* | 8/2016 | Hosoi | H04M 1/03 |
| 2016/0309414 A1* | 10/2016 | Matsumoto | H04W 52/0245 |
| 2017/0048379 A1* | 2/2017 | Tanabe | H04M 1/72569 |

FOREIGN PATENT DOCUMENTS

| | | |
|---|---|---|
| JP | 2013008313 A | 1/2013 |
| JP | 2014130067 A | 7/2014 |
| KR | 10-2014-0126027 A | 10/2014 |
| KR | 10-2015-0029976 A | 3/2015 |
| WO | 2014/204022 A1 | 12/2014 |
| WO | 2015/108223 A1 | 7/2015 |

* cited by examiner

METHOD FOR CONTROLLING ACCORDING TO STATE AND ELECTRONIC DEVICE THEREOF

CROSS-REFERENCE TO RELATED APPLICATION(S)

This application claims the benefit under 35 U.S.C. § 119(a) of a Korean patent application filed on Aug. 11, 2015 in the Korean Intellectual Property Office and assigned Serial number 10-2015-0113098, the entire disclosure of which is hereby incorporated by reference.

TECHNICAL FIELD

The present disclosure relates to an electronic device and a method for determining a state of the electronic device and for performing a control based thereon.

BACKGROUND

An electronic device may be a portable electronic device (e.g., a mobile device) or a wearable electronic device (or a wearable device), and the like. The wearable electronic device may periodically operate an infrared (IR) sensor attached to a rear side of the electronic device to determine whether an object is in proximity. The electronic device may be determined as a wear state if the object is in proximity, and may be determined as a not-wear state if the object is not in proximity.

In a case where whether an electronic device (or a wearable device) is worn/not worn is recognized on a real time basis by periodically operating an infrared (IR) sensor, the electronic device must confirm whether it is worn by setting an operation period as short as possible. Since the IR sensor is a component which consumes a relatively great amount of current, if the IR sensor is used frequently, a usage time of the electronic device can be significantly decreased due to a great amount of current consumption. For example, in order to recognize either rapidly or on a real time basis whether an electronic device of a user is worn/not worn by periodically operating a proximity sensor in the wearable device, whether an object is in proximity must be confirmed frequently by setting the operation period as short as possible, which may result in a great amount of current consumption. Further, if whether the electronic device is worn/not worn is determined by using only the IR sensor, a state in which a rear side of the terminal is in contact with an object (e.g., a desk) not worn by the user may also be recognized as a wear state.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an electronic device and a method for determining a state (e.g., not-carry/carry/wear) of the electronic device by using information of a plurality of sensors attached thereto.

Another aspect of the present disclosure is to provide an electronic device for determining a not-carry/carry state of the electronic device by using a first sensor having a small amount of current consumption, and for determining a carry/wear state of the terminal by using a second sensor having a relatively great amount of current consumption in comparison with the first sensor in the carry state.

According to the various embodiments of the present disclosure, if a motion of the electronic device occurs in a pre-defined type in the carry state, the second sensor having the relatively great amount of current consumption may be activated, and a carry/wear state of the terminal may be determined by using the second sensor.

In accordance with an aspect of the present disclosure, the method is provided. The method includes obtaining first state information related to a motion of the electronic device by using a first sensor operatively coupled to the electronic device while the electronic device is in a first state, transitioning, if the first state information satisfies a first designated condition, the electronic device from the first state to a second state, obtaining second state information related to at least a part of a user's body corresponding to the electronic device by using a second sensor operatively coupled to the electronic device while the electronic device is in the second state, and transitioning, if the second state information satisfies a second designated condition, the electronic device from the second state to a third state.

In accordance with another aspect of the present disclosure, an electronic device is provided. The electronic device includes a memory configured to store a first designated condition and a second designated condition corresponding to states of the electronic device, and at least one processor. The at least one processor may be configured to obtain first state information related to a motion of the electronic device by using a first sensor operatively coupled to the electronic device while the electronic device is in a first state, transition, if the first state information satisfies a first designated condition, the electronic device from the first state to a second state, obtain second state information related to at least a part of a user's body corresponding to the electronic device by using a second sensor operatively coupled to the electronic device while the electronic device is in the second state, and transition, if the second state information satisfies a second designated condition, the electronic device from the second state to a third state.

In a storage medium storing instructions configured to allow at least one processor to perform at least one operation when the instructions are executed by the at least one processor, a computer-readable storage medium storing a program for executing the at least one operation including obtaining first state information related to a motion of the electronic device by using a first sensor operatively coupled to the electronic device while the electronic device is in a first state, transitioning, if the first state information satisfies a first designated condition, the electronic device from the first state to a second state, obtaining second state information related to at least a part of a user's body corresponding to the electronic device by using a second sensor operatively coupled to the electronic device while the electronic device is in the second state, and transitioning, if the second state information satisfies a second designated condition, the electronic device from the second state to a third state.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
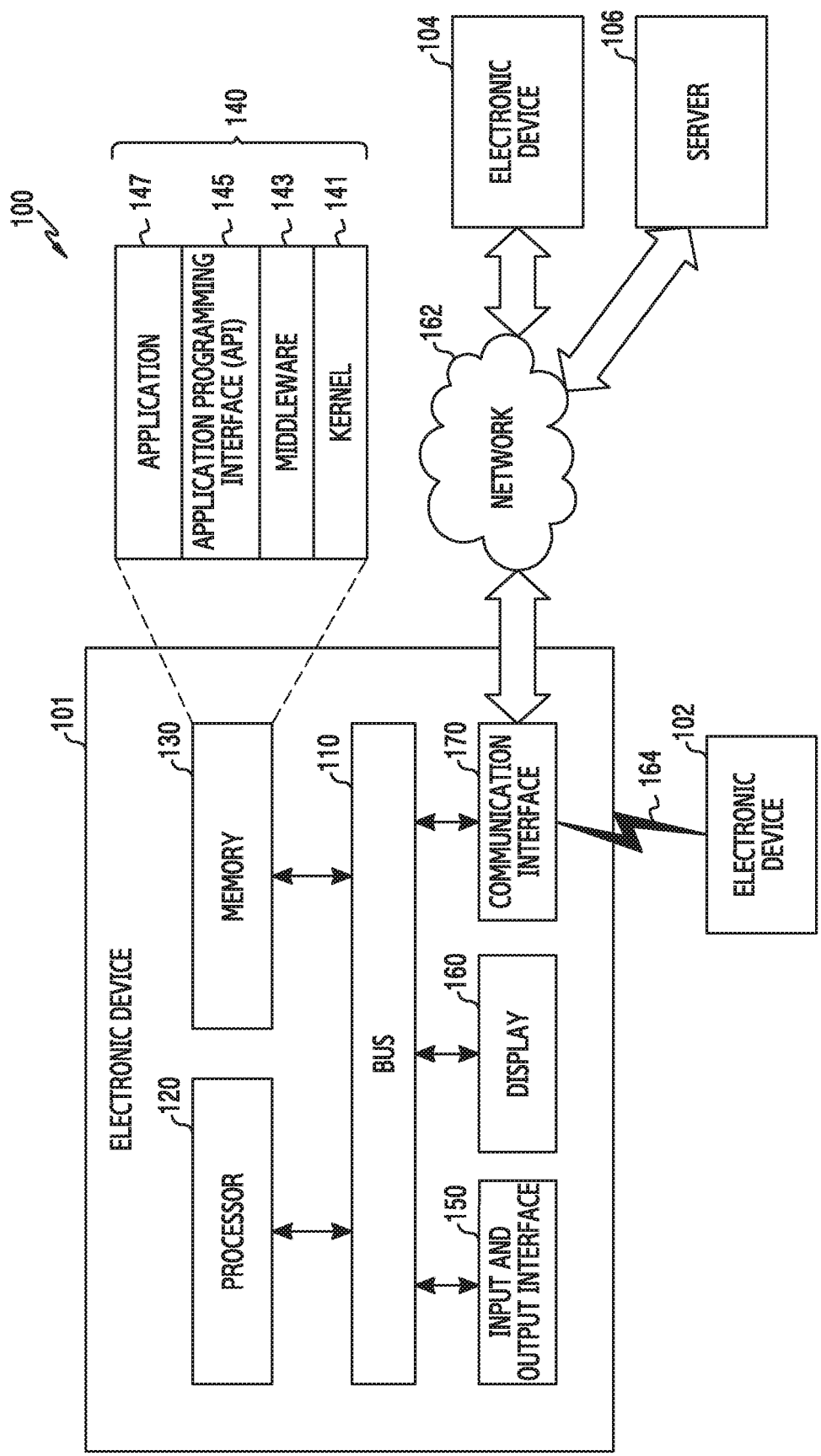
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions are omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terms "have", "may have", "include", or "may include" used in the various embodiments of the present disclosure indicate the presence of disclosed corresponding functions, operations, elements, and the like, and do not limit additional one or more functions, operations, elements, and the like. In addition, it should be understood that the terms "include" or "have" used in the various embodiments of the present disclosure are to indicate the presence of features, numbers, operations, elements, parts, or a combination thereof described in the specifications, and do not preclude the presence or addition of one or more other features, numbers, operations, elements, parts, or a combination thereof.

The terms "A or B", "at least one of A or/and B" or "one or more of A or/and B" used in the various embodiments of the present disclosure include any and all combinations of words enumerated with it. For example, "A or B", "at least one of A and B" or "at least one of A or B" indicating (1) including at least one A, (2) including at least one B, or (3) including both at least one A and at least one B.

Although the term, such as "first" and "second" used in various embodiments of the present disclosure may modify various elements of various embodiments of the present disclosure, these terms do not limit the corresponding elements. For example, these terms do not limit an order and/or importance of the corresponding elements. These terms may be used for the purpose of distinguishing one element from another element. For example, a first user device and a second user device all indicate user devices and may indicate different user devices. For example, a first element may be named a second element without departing from the scope of right of various embodiments of the present disclosure, and similarly, a second element may be named a first element.

It will be understood that when an element (e.g., a first element) is "connected to" or "(operatively or communicatively) coupled with/to" to another element (e.g., a second element), the element may be directly connected or coupled to another element, and there may be an intervening element (e.g., a third element) between the element and another element. To the contrary, it will be understood that when an element (e.g., the first element) is "directly connected" or "directly coupled" to another element (e.g., the second element), there is no intervening element (e.g., the third element) between the element and another element.

The expression "configured to (or set to)" used in various embodiments of the present disclosure may be replaced with "suitable for", "having the capacity to", "designed to", "adapted to", "made to", or "capable of" according to a situation. The term "configured to (set to)" does not necessarily mean "specifically designed to" in a hardware level. Instead, the expression "apparatus configured to . . . " may mean that the apparatus is "capable of . . . " along with other devices or parts in a certain situation. For example, "a processor configured to (set to) perform A, B, and C" may be a dedicated processor, e.g., an embedded processor, for performing a corresponding operation, or a generic-purpose processor, e.g., a central processing unit (CPU) or an application processor (AP), capable of performing a corresponding operation by executing one or more software programs stored in a memory device.

The terms as used herein are used merely to describe certain embodiments and are not intended to limit the present disclosure. Further, all the terms used herein, including technical and scientific terms, should be interpreted to have the same meanings as commonly understood by those skilled in the art to which the present disclosure pertains, and should not be interpreted to have ideal or excessively formal meanings unless explicitly defined in various embodiments of the present disclosure.

An electronic device according to various embodiments of the present disclosure may be a device. For example, the electronic device according to various embodiments of the present disclosure may include at least one of a smart phone, a tablet personal computer (PC), a mobile phone, a video phone, an e-book reader, a desktop PC, a laptop PC, a netbook computer, a workstation, a server, a personal digital assistant (PDA), a portable multimedia player (PMP), a moving picture expert group phase 1 or phase 2 (MPEG-1 or MPEG-2) audio layer-3 (MP3) player, a mobile medical device, a camera, a power bank, or a wearable device (e.g., a head-mount-device (HMD), an electronic glasses, an electronic clothing, an electronic bracelet, an electronic necklace, an electronic appcessory, an electronic tattoo, a smart mirror, or a smart watch).

In other embodiments of the present disclosure, an electronic device may be a home appliance. For example, of such appliances may include at least one of a television (TV), a digital versatile disc (DVD) player, an audio component, a refrigerator, an air conditioner, a vacuum cleaner, an oven, a microwave oven, a washing machine, an air cleaner, a set-top box, a home automation control panel, a security control panel, a TV box (e.g., Samsung HomeSync®, Apple TV®, or Google TV®), a game console (e.g., Xbox® PlayStation®), an electronic dictionary, an electronic key, a camcorder, or an electronic frame.

In other embodiments of the present disclosure, an electronic device may comprise at least one of a medical equipment (e.g., a mobile medical device (e.g., a blood glucose monitoring device, a heart rate monitor, a blood pressure monitoring device or a temperature meter), a magnetic resonance angiography (MRA) machine, a magnetic resonance imaging (MRI) machine, a computed tomography (CT) scanner, or an ultrasound machine), a navigation device, a global navigation satellite system (GNSS), an event data recorder (EDR), a flight data recorder (FDR), an in-vehicle infotainment device, an electronic equipment for a ship (e.g., ship navigation equipment and/or a gyrocompass), an avionics equipment, a security equipment, a head unit for vehicle, an industrial or home robot, an automatic teller's machine (ATM) of a financial institution, point of sale (POS) device at a retail store, or an Internet of things (IoT) device (e.g., a lightbulb, various sensors, an electronic meter, a gas meter, a sprinkler, a fire alarm, a thermostat, a streetlamp, a toaster, a sporting equipment, a hot-water tank, a heater, or a boiler, and the like).

In certain embodiments of the present disclosure, an electronic device may comprise at least one of: a piece of furniture or a building/structure, an electronic board, an electronic signature receiving device, a projector, and various measuring instruments (e.g., a water meter, an electricity meter, a gas meter, or a wave meter). Further, it will be apparent to those skilled in the art that an electronic device according to various embodiments of the present disclosure is not limited to the above-mentioned devices.

Herein, the term "user" may indicate a person who uses an electronic device or a device (e.g., an artificial intelligence electronic device) that uses the electronic device.

FIG. 1 illustrates a network environment including an electronic device according to various embodiments of the present disclosure.

Referring to FIG. 1, an electronic device 101 in a network environment 100, according to the various embodiments of the present disclosure, will be described below with reference to FIG. 1. The electronic device 101 may comprise a bus 110, a processor 120, a memory 130, an input/output interface 150, a display 160, and a communication interface 170. In an embodiment of the present disclosure, at least one of the elements of the electronic device 101 may be omitted, or other elements may be additionally included in the electronic device 101.

The bus 110 may include, for example, a circuit that interconnects the elements 120 to 170 and transfers communication (e.g., a control message and/or data) between the elements.

The processor 120 may include one or more of a CPU, an AP, and a communication processor (CP). The processor 120 may execute, for example, an arithmetic operation or data processing related to a control and/or communication of at least one different component of the electronic device 101. In particular, according to an embodiment of the present disclosure, the processor 120 may receive primary proximity service data, and may provide control to receive secondary proximity service data by using guide information required to receive the secondary proximity service data included in the primary proximity service data. Alternatively, the processor 120 may provide control to transmit the primary proximity service data including the guide information required to receive the secondary proximity service data.

The memory 130 may include any suitable type of volatile or non-volatile memory, such as random-access memory (RAM), read-only memory (ROM), network accessible storage (NAS), cloud storage, a solid state drive (SSD), and the like. In operation, the memory 130 may store, for example, instructions or data (e.g., motion pattern information and motion data) relevant to at least one other element of the electronic device 101. According to an embodiment of the present disclosure, the memory 130 may store software and/or a program 140. For example, the program may include a kernel 141, middleware 143, an application programming interface (API) 145, and an application (or application program) 147. At least some of the kernel 141, the middleware 143, and the API 145 may be referred to as an operating system (OS).

The kernel 141 may control or manage system resources (e.g., the bus 110, the processor 120, or the memory 130) used for performing an operation or function implemented by the other programs (e.g., the middleware 143, the API 145, or the application 147). Furthermore, the kernel 141 may provide an interface through which the middleware 143, the API 145, or the application 147 may access the individual elements of the electronic device 101 to control or manage the system resources.

The middleware 143, for example, may function as an intermediary for allowing the API 145 or the application 147 to communicate with the kernel 141 to exchange data.

In addition, the middleware 143 may process one or more task requests received from the application 147 according to priorities thereof. For example, the middleware 143 may assign priorities for using the system resources (e.g., the bus 110, the processor 120, the memory 130, and the like) of the electronic device 101, to at least one of the application 147. For example, the middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, or text control.

The input/output interface 150, for example, may function as an interface that may transfer instructions or data input from a user or another external device to the other element(s) of the electronic device 101. Furthermore, the input/output interface 150 may output the instructions or data received from the other element(s) of the electronic device 101 to the user or another external device.

Examples of the display 160 may include a liquid crystal display (LCD), a light-emitting diode (LED) display, an organic LED (OLED) display, a microelectromechanical systems (MEMS) display, and an electronic paper display. The display 160, for example, may display various types of content (e.g., text, images, videos, icons, or symbols) to the user. The display 160 may include a touch screen and receive, for example, a touch, gesture, proximity, or hovering input using an electronic pen or a body part of a user.

The communication interface 170, for example, may set communication between the electronic device 101 and an external device (e.g., a first external electronic device 102, a second external electronic device 104, or a server 106). For example, the communication interface 170 may be connected to a network 162 through wireless or wired communication to communicate with the external device (e.g., the second external electronic device 104 or the server 106).

The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may be performed by using at least one of, for example, Wi-Fi, Bluetooth (BT), near field communication (NFC), and global navigation satellite system (GNSS). The GNSS may include at least one of, for example, a global positioning system (GPS), a global navigation satellite system (Glonass), a Beidou navigation satellite system (hereinafter, referred to as "Beidou"), and Galileo (European global satellite-based navigation system). Hereinafter, in an embodiment of the present disclosure, the "GPS" may be interchangeably used with the "GNSS". The wired communication may include at least one of, for example, a universal serial bus (USB), a high definition multimedia interface (HDMI), recommended standard-232 (RS-232), and a plain old telephone service (POTS). The network 162 may include at least one of a communication network, such as a computer network (e.g., a local area network (LAN) or a wide area network (WAN), the Internet, and a telephone network.

Each of the first and second external electronic devices 102 and 104 may be of a type identical to or different from that of the electronic device 101. According to an embodiment of the present disclosure, the server 106 may include a group of one or more servers. According to various embodiments of the present disclosure, all or some of the operations performed in the electronic device 101 may be performed in another electronic device or a plurality of electronic devices (e.g., the electronic device 102 and the electronic device 104 or the server 106). According to an embodiment of the present disclosure, when the electronic device 101 has to perform some functions or services automatically or in response to a request, the electronic device 101 may make a request for performing at least some functions relating thereto to another device (e.g., the electronic device 102 or the electronic device 104 or the server 106) instead of performing the functions or services by itself or in addition. Another electronic device (e.g., the electronic device 102 or the electronic device 104 or the server 106) may execute the requested functions or the additional functions, and may deliver a result of the execution to the electronic device 101. The electronic device 101 may process the received result as it is or additionally to provide the requested functions or services. To achieve this, for example, cloud computing, distributed computing, or client-server computing technology may be used.

Figure 2:
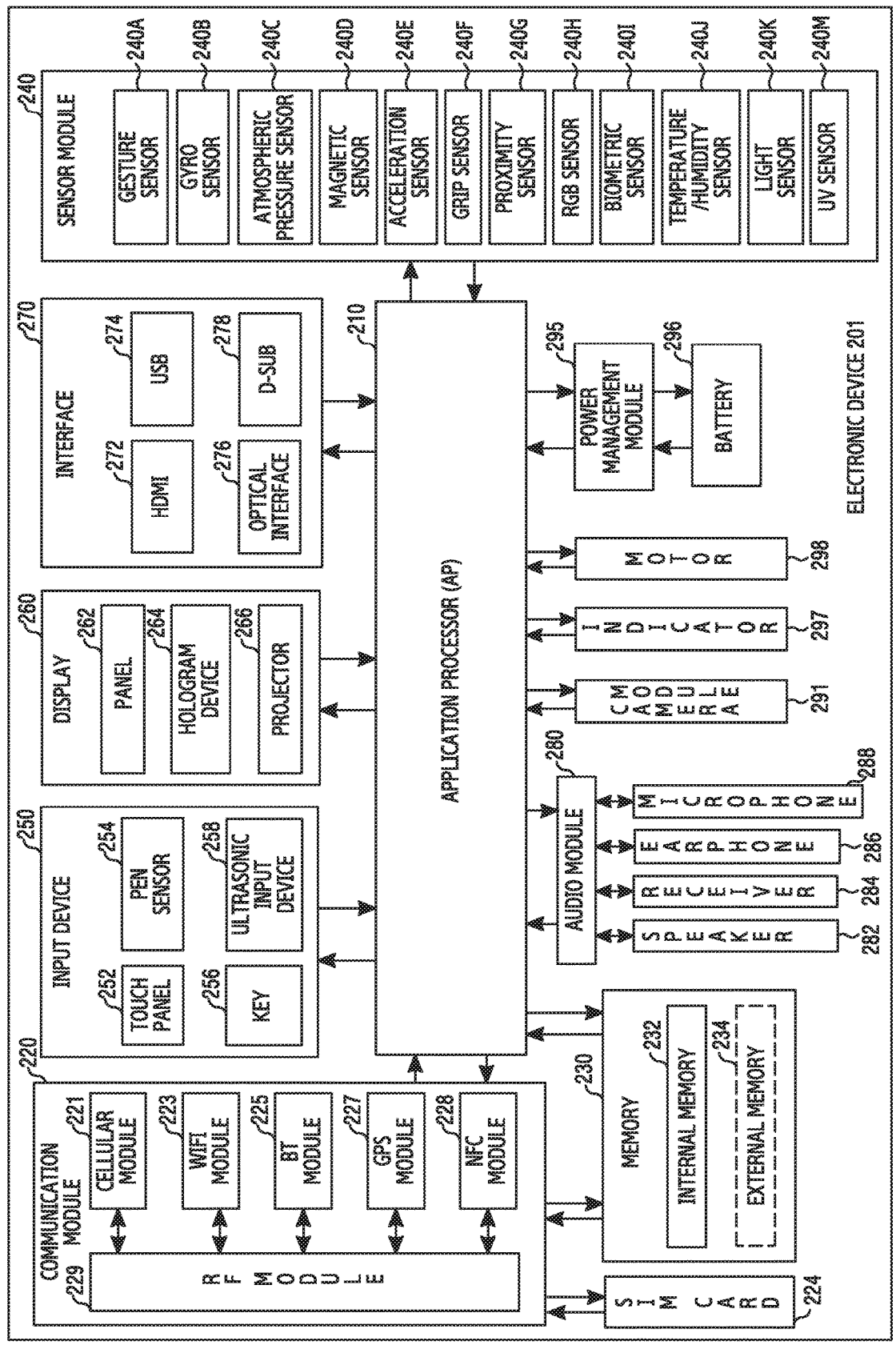
FIG. 2 is a block diagram of an electronic device according to various embodiments of the present disclosure.

FIG. 2 is a block diagram of an electronic device according to various embodiments of the present disclosure.

Referring to FIG. 2, an electronic device 201 may comprise, for example, all or a part of the electronic device 101 illustrated in FIG. 1. The electronic device 201 may comprise at least one AP 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 may control a plurality of hardware or software components connected to the AP 210, for example, by driving an OS or an application program, and may perform a variety of data processing and arithmetic operations. The AP 210 may be implemented, for example, with a system-on-chip (SoC). According to an embodiment of the present disclosure, the AP 210 may further include a graphic processing unit (GPU) and/or an image signal processor (ISP). The AP 210 may include at least a part (e.g., the cellular module 221) of the components shown in FIG. 2. The AP 210 may process an instruction or data, which is received from at least one of different components (e.g., a non-volatile memory), by loading it to a volatile memory and may store a variety of data in the non-volatile memory.

The communication module 220 may have a configuration that is the same as or similar to that of the communication interface 160 of FIG. 1. The communication module 220 may include, for example, a cellular module 221, a Wi-Fi module 223, a BT module 225, a GPS module 227, an NFC module 228, and a radio frequency (RF) module 229. The communication module 220 provides a function of transmitting/receiving a signal. Accordingly, the communication module 220 may be referred to as a "reception unit", a "transmission unit", a "transmission and reception unit", a "communication unit", and the like.

The cellular module 221 may provide, for example, a voice call, a video call, a text message service, or an Internet service through a communication network. According to an embodiment of the present disclosure, the cellular module 221 may distinguish and authenticate the electronic device 201 in the communication network by using a SIM (e.g., the SIM card 224). According to an embodiment of the present disclosure, the cellular module 221 may perform at least some of the functions that the AP 210 may provide. According to an embodiment of the present disclosure, the cellular module 221 may include a CP.

The Wi-Fi module 223, the BT module 225, the GPS module 227, or the NFC module 228 may include, for example, a processor for processing data transmitted/received through the corresponding module. According to an embodiment of the present disclosure, at least some (e.g., two or more) of the cellular module 221, the Wi-Fi module 223, the BT module 225, the GPS module 227, and the NFC module 228 may be included in a single integrated chip (IC) or IC package.

The RF module 229 may, for example, transmit/receive a communication signal (e.g., an RF signal). The RF module 229 may include, for example, a transceiver, a power amp module (PAM), a frequency filter, a low noise amplifier (LNA), or an antenna. According to another embodiment of the present disclosure, at least one of the cellular module 221, the Wi-Fi module 223, the BT module 225, the GPS module 227, and the NFC module 228 may transmit/receive an RF signal through a separate RF module.

The SIM card 224 may include, for example, a card including a SIM and/or an embedded SIM, and may further include unique identification information (e.g., an integrated circuit card identifier (ICCID)) or subscriber information (e.g., international mobile subscriber identity (IMSI)).

The memory 230 may include, for example, an internal memory 232 or an external memory 234. The internal memory 232 may include, for example, at least one of a volatile memory (e.g., a dynamic RAM (DRAM), a static RAM (SRAM), a synchronous dynamic RAM (SDRAM), and the like) and a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, or a solid state drive (SSD)).

The external memory 234 may further include a flash drive, for example, a compact flash (CF), a secure digital (SD), a micro-SD, a mini-SD, an extreme digital (xD), a memory stick, and the like. The external memory 234 may be functionally and/or physically connected to the electronic device 201 through various interfaces.

The sensor module 240 may, for example, measure a physical quantity or detect an operating state of the electronic device 201, and may convert the measured or detected information into an electrical signal. The sensor module 240 may include, for example, at least one of, a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, and blue (RGB) sensor), a bio-sensor 240I, a temperature/humidity sensor 240J, an illumination sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In an embodiment of the present disclosure, the electronic device 201 may further comprise a processor that is configured as a part of the AP 210 or a separate element from the AP 210 in order to control the sensor module 240, thereby controlling the sensor module 240 while the AP 2710 is in a sleep state.

The input device 250 may include, for example, a touch panel 252, a (digital) pen sensor 254, a key 256, or an ultrasonic input device 258. The touch panel 252 may use at least one of, for example, a capacitive type, a resistive type, an IR type, and an ultrasonic type. In addition, the touch panel 252 may further include a control circuit. The touch panel 252 may further include a tactile layer to provide a tactile reaction to a user.

The (digital) pen sensor 254 may be, for example, a part of the touch panel, or may include a separate recognition sheet. The key 256 may include, for example, a physical button, an optical key, or a keypad. The ultrasonic input device 258 may identify data by detecting acoustic waves with a microphone (e.g., a microphone 288) of the electronic device 201 through an input unit for generating an ultrasonic signal.

The display 260 (e.g., the display 160) may include a panel 262, a hologram device 264, or a projector 266. The panel 262 may include a configuration that is the same as or similar to that of the display 160 of FIG. 1. The panel 262 may be implemented to be, for example, flexible, transparent, or wearable. The panel 262 may be configured as a single module integrated with the touch panel 252. The hologram device 264 may show a stereoscopic image in the air using interference of light. The projector 266 may project light onto a screen to display an image. The screen may be located, for example, in the interior of or on the exterior of the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included in, for example, the communication interface 160 illustrated in FIG. 1. Additionally or alternatively, the interface 270 may include, for example, a mobile high-definition link (MHL) interface, a SD card/multi-media card (MMC) interface, or an infrared data association (IrDA) standard interface.

The audio module 280 may, for example, convert a sound into an electrical signal, and vice versa. At least some elements of the audio module 280 may be included in, for example, the input/output interface 140 illustrated in FIG. 1. The audio module 280 may, for example, process sound information that is input or output through the speaker 282, the receiver 284, the earphones 286, the microphone 288, and the like.

The camera module 291 may be, for example, a device that may take a still image or a moving image, and according to an embodiment of the present disclosure, the camera module 291 may include one or more image sensors (e.g., a front sensor or a rear sensor), a lens, an ISP, or a flash (e.g., an LED or a xenon lamp).

The power management module 295 may, for example, manage power of the electronic device 201. According to an embodiment of the present disclosure, the power management module 295 may include a power management integrated circuit (PMIC), a charger IC, or a battery or fuel gauge. The PMIC may use a wired and/or wireless charging method. Examples of the wireless charging method may include, for example, a magnetic resonance scheme, a magnetic induction scheme, an electromagnetic wave scheme, and the like. Further, the power management module 295 may further include additional circuits (e.g., a coil loop, a resonance circuit, a rectifier, and the like) for wireless charging. The battery gauge may measure, for example, a residual quantity of the battery 296, and a voltage, a current, or a temperature during the charging. The battery 296 may include, for example, a rechargeable battery and/or a solar battery.

The indicator 297 may indicate a specific state of the electronic device 201 or a part thereof (e.g., the AP 210), for example, a booting state, a message state, a charging state, and the like. The motor 298 may convert an electrical signal into a mechanical vibration, and may generate a vibration effect or a haptic effect. Although not illustrated, the electronic device 201 may comprise a processing unit (e.g., a GPU) for mobile TV support. The processing device for mobile TV support may, for example, process media data according to a standard of digital multimedia broadcasting (DMB), digital video broadcasting (DVB), media flow, and the like.

Each of the components of the electronic device according to the present disclosure may be implemented by one or more components and the name of the corresponding component may vary depending on a type of the electronic device. In various embodiments of the present disclosure, the electronic device may comprise at least one of the above-described elements. Some of the above-described elements may be omitted from the electronic device, or the electronic device may further comprise additional elements. Further, some of the elements of the electronic device according to various embodiments of the present disclosure may be coupled to form a single entity while performing the same functions as those of the corresponding elements before the coupling.

Figure 3:
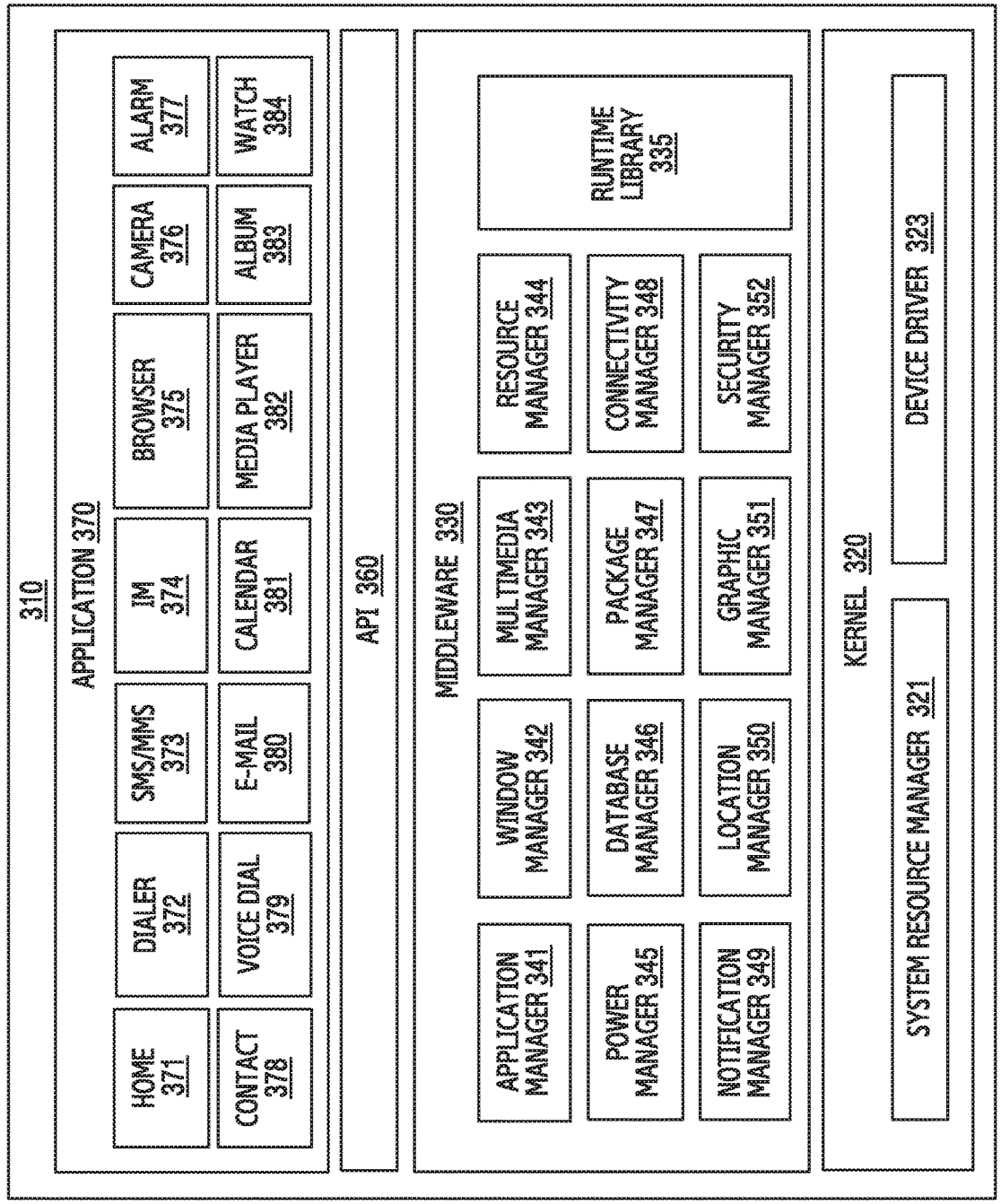
FIG. 3 is a block diagram of a program module according to various embodiments of the present disclosure.

FIG. 3 is a block diagram of a program module according to various embodiments of the present disclosure.

Referring to FIG. 3, according to an embodiment of the present disclosure, a program module 310 (e.g., the program 140) may include an OS that controls resources relating to an electronic device (e.g., the electronic device 101) and/or various applications (e.g., the application 147) executed in the OS. The OS may be, for example, Android, iOS™, Windows™, Symbian™, Tizen™, Bada™, and the like.

The programming module 310 may include a kernel 320, middleware 330, an API 360, and/or applications 370. At least some of the program module 310 may be preloaded in the electronic device, or may be downloaded from an external electronic device (e.g., the electronic device 102, the electronic device 104, and the server 106).

The kernel 320 (e.g., the kernel 141 of FIG. 1) may include, for example, a system resource manager 321 or a device driver 323. The system resource manager 321 may control, allocate, or collect system resources. According to an embodiment of the present disclosure, the system resource manager 321 may include a process management unit, a memory management unit, or a file system management unit. The device driver 323 may include, for example, a display driver, a camera driver, a BT driver, a shared-memory driver, a USB driver, a keypad driver, a Wi-Fi driver, an audio driver, or an inter-process communication (IPC) driver.

The middleware 330 may provide a function required by the applications 370 in common, or may provide various functions to the applications 370 through the API 360 to enable the applications 370 to efficiently use limited system resources in the electronic device. According to an embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module used by a complier in order to add a new function through a programming language during the execution of the applications 370. The run time library 335 may perform input/output management, memory management, or a function for an arithmetic function.

The application manager 341 may manage, for example, a life cycle of at least one of the applications 370. The window manager 342 may manage GUI resources used by a screen. The multimedia manager 343 may identify a format required for reproducing various media files, and may encode or decode a media file using a codec suitable for the corresponding format. The resource manager 344 may manage resources of at least one of the applications 370, such as a source code, a memory, a storage space, and the like.

The power manager 345 may operate together with, for example, a basic input/output system (BIOS) to manage a battery or power and provide power information required for an operation of the electronic device. The database manager 346 may generate, search, or change a database to be used by at least one of the applications 370. The package manager 347 may manage installation or update of an application distributed in the format of a package file.

The connectivity manager 348 may manage, for example, a wireless connection, such as Wi-Fi or BT. The notification manager 349 may display or notify of an event, such as a received message, an appointment, and a proximity notification, in such a manner as not to disturb a user. The location manager 350 may manage location information of the electronic device. The graphic manager 351 may manage a graphic effect to be provided to a user, or a user interface related thereto. The security manager 352 may provide all security functions required for system security or user authentication. According to an embodiment of the present disclosure, in cases where the electronic device (e.g., the electronic device 101) has a telephone call function, the middleware 330 may further include a telephony manager for managing a voice or video call function of the electronic device.

The middleware 330 may include a middleware module that forms combinations of various functions of the aforementioned elements. The middleware 330 may provide specialized modules according to the types of OSs in order to provide differentiated functions. In addition, the middleware 330 may dynamically delete some of the existing elements, or may add new elements.

The API 360 (e.g., the API 145) may be, for example, a set of API programming functions, and may be provided with different configurations according to OSs. For example, in the case of Android or iOS, one API set may be provided for each platform, and in the case of Tizen™, two or more API sets may be provided for each platform.

The applications 370 (e.g., the application 147) may include, for example, one or more applications that may provide functions, such as home 371, dialer 372, short message service (SMS)/multimedia messaging service (MMS) 373, instant message (IM) 374, browser 375, camera 376, alarm 377, contact 378, voice dialer 379, e-mail 380, calendar 381, media player 382, album 383, clock 384, health care (e.g., to measure exercise quantity or blood sugar), or environment information (e.g., atmospheric pressure, humidity, or temperature information).

According to an embodiment of the present disclosure, the applications 370 may include an application (hereinafter, referred to as an "information exchange application" for convenience of the description) that supports information exchange between the electronic device (e.g., the electronic device 101) and external electronic devices (e.g., the electronic devices 102 and 104). The information exchange application may include, for example, a notification relay application for transmitting specific information to the external electronic device, or a device management application for managing the external electronic device.

For example, the notification relay application may include a function of transferring, to an external electronic device (e.g., the electronic device 102 or the electronic device 104), notification information generated from other applications of the electronic device (e.g., an SMS/MMS application, an e-mail application, a health management application, or an environmental information application). Furthermore, the notification relay application may, for example, receive notification information from an external electronic device and provide the received notification information to a user. The device management application may, for example, manage (e.g., install, delete, or update) at least one function of an external electronic device (e.g., the electronic device 104) communicating with the electronic device (for example, a function of turning on/off the external electronic device itself (or some elements thereof), or a function of adjusting luminance (or a resolution) of the display), applications operating in the external electronic device, or services provided by the external electronic device (e.g., a telephone call service or a message service).

According to an embodiment of the present disclosure, the applications 370 may include an application (e.g., a health care application) specified according to attributes (e.g., attributes of the electronic device, such as the type of an electronic device which corresponds to a mobile medical device of the external electronic device (e.g., the electronic device 102 or the electronic device 104). According to one embodiment of the present disclosure, the applications 370 may include an application received from an external electronic device (e.g., the server 106 or the electronic device 102 or the electronic device 104). According to an embodiment of the present disclosure, the applications 370 may include a preloaded application or a third party application that may be downloaded from a server. The names of the elements of the program module 310, according to the embodiment illustrated in the drawing, may vary according to the type of OS.

According to various embodiments of the present disclosure, at least a part of the programming module 310 may be implemented in software, firmware, hardware, or a combination of two or more thereof. At least some of the programming module 310 may be implemented (for example, executed) by, for example, the processor (for example, the AP 210). At least some of the programming module 310 may include, for example, a module, a program, a routine, sets of instructions, a process, and the like, for performing one or more functions.

The term "module" used in the present document, for example, may refer to a unit that includes one of hardware, software, or firmware, or a combination thereof. The "module," for example, may be interchangeably used with the terms, such as a unit, logic, a logical block, a component, or a circuit. The "modules" may be the minimum unit of a component, which is integrally formed, or a portion thereof. The "module" may be the minimum unit, which performs one or more functions, or a portion thereof. The "module" may be implemented mechanically or electronically. For example, the "module" may include at least one of an application specific integrated circuit (ASIC) chip, a field-programmable gate array (FPGA), or a programmable logic device, which is known or will be developed in the future, and which performs some operations.

At least some of the device (e.g., modules or functions) or the method (e.g., operations), according to various embodiments of the present disclosure, for example, may be implement by instructions that are stored, in the form of a program module, in a computer-readable storage medium. One or more processors may perform the function corresponding to the instruction when the instruction is executed by the processor (e.g., the processor 120). The computer-readable storage medium, for example, may be the memory 130.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include a Read-Only Memory (ROM), a Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

The module or the program module, according to various embodiments of the present disclosure, may include one or more elements described above, exclude some of them, or further include other elements. The operations performed by the module, the program module, or other elements, according to various embodiments of the present disclosure, may be executed in a sequential, parallel, iterative, or heuristic method. In addition, some operations may be executed in a different order, or may be omitted, or other operations may be added. In addition, the embodiments disclosed in the present document are intended for the explanation and understanding of the technical matter, and shall not limit the scope of the technology described in the present document. Accordingly, the scope of the present disclosure should be construed to encompass all modifications or various other embodiments based on the technical concept of the present disclosure.

In addition, the embodiments disclosed in the present document are intended for the explanation and understanding of the disclosed technical matter, and shall not limit the scope of various embodiments of the present document. Therefore, the scope of various embodiments of the present document should be construed to encompass all modifications or various other embodiments based on the technical concept of the various embodiments of the present disclosure.

In the electronic device according to the various embodiments of the present disclosure, the term 'first state' may imply a state in which the electronic device is not carried. The term 'not-carry' may imply a state in which the electronic device is not carried by a user or a state in which there is no motion of the electronic device, and the like.

In the electronic device according to the various embodiments of the present disclosure, the term 'second state' may imply a state in which the electronic device is carried by the user. The term 'carry' may imply that the user carries a portable device, or may imply that there is a motion of the electronic device. For example, it may include a state in which the user carries the electronic device in a user's body or a state in which the user moves together with the electronic device (e.g., moves in a vehicle). In an embodiment of the present disclosure, a carry state may be distinguished from a wear state. For example, in an embodiment of the present disclosure, the carry state may imply a state in which the user carries the electronic device in the user's body but the electronic device is not attached to the body or is not closely connected thereto.

In the electronic device according to the various embodiments of the present disclosure, the term 'third state' may imply a state in which the electronic device is worn or authenticated by the user. The term 'wear' may imply a state in which the electronic device is attached to the user's body or is closely connected thereto.

In the electronic device according to the various embodiments of the present disclosure, a first sensor may be a sensor for detecting a motion of the electronic. For example, the first sensor may be an acceleration sensor, a gyro sensor, a gesture sensor, and the like.

In the electronic device according to the various embodiments of the present disclosure, a second sensor may be a sensor for detecting proximity, touch, authentication, and the like, of the electronic device. The second sensor may be a proximity sensor (e.g., an IR sensor), a touch sensor, a biosensor (e.g., a heart rate (HR) sensor), a temperature sensor, a vein sensor, an iris sensor, a camera sensor, a voice sensor, an electrode sensor for measuring skin impedance, and the like.

Figure 4:
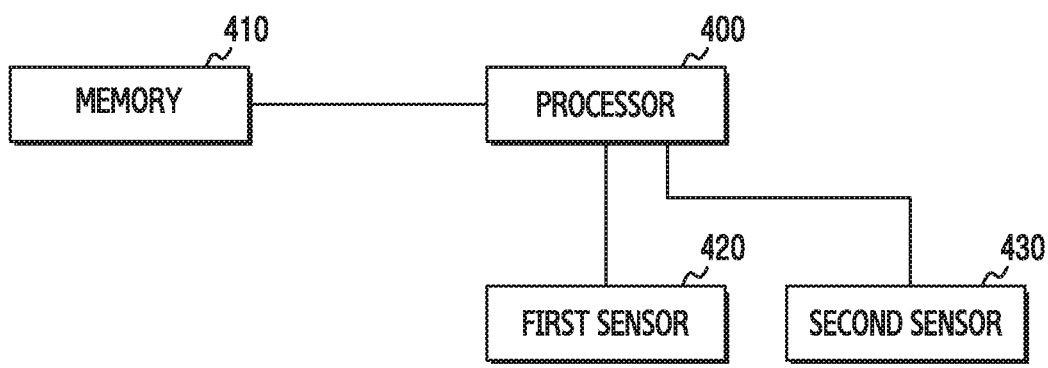
FIG. 4 illustrates an electronic device for a control depending on a state according to an embodiment of the present disclosure.

FIG. 4 illustrates an electronic device for a control depending on a state according to an embodiment of the present disclosure.

Referring to FIG. 4, the electronic device may include a processor 400, a memory 410, a first sensor 420, and a second sensor 430.

Referring to FIG. 4, the memory 410 may store information related to a first designated condition and a second designated condition. The first designated condition may imply a condition in which a motion of the electronic device is detected to be above a specific level and is detected for longer than a specific time duration. Alternatively, it may imply a condition in which the motion of the electronic device is detected as a pre-set motion. The second designated condition may imply a condition in which the electronic device is in proximity to a user within a specific distance, or is touched or authenticated. Information regarding the first designated condition and the second designated condition may be reconfigured by using information, such as a time, a motion state, a body state, and the like.

The first sensor 420 may be a sensor capable of detecting the motion of the electronic device. The first sensor 420 may include at least one of an acceleration sensor, a gyro sensor, and a geo-magnetic sensor. Output date of the first sensor 420 may be used as data for determining the first designated condition.

The second sensor 430 may be a sensor capable of detecting whether the electronic device is worn or whether the user of the electronic device is authenticated. The second sensor 430 may be attached to a position which may be in contact with the user (e.g., in case of a watch-type wearable device, a position which may be in contact with a wrist of the user in a rear side of the electronic device). The second sensor 430 may detect that the electronic device is in proximity to the user or is touched. The second sensor 430 may be a proximity sensor, a touch sensor, a biosensor (e.g., a fingerprint sensor, an electrocardiogram sensor, a body heat sensor, a pulse sensor, an iris sensor, a blood pressure sensor, a vein sensor, an oxygen saturation sensor, a body-fat sensor, a skin-aging sensor, a skin-humidity sensor, a heart rate monitoring (HRM) sensor, an electrode sensor for measuring skin impedance), a temperature sensor, a camera sensor, or a voice sensor. According to an embodiment of the present disclosure, the proximity sensor may be an IR sensor. The HRM sensor may include the IR sensor. Output data of the second sensor 430 may be used as data for determining the second designated condition.

The processor 400 may be operatively coupled to the memory 410, the first sensor 420, and the second sensor 430. The processor 400 may analyze output data of the first sensor 420 having a small amount of current consumption in a not-carry state (i.e., a first state) of the electronic device to determine a not-carry state 501/carry state 503 (see FIG. 5) of the electronic device, and may analyze output data of the second sensor 430 having a relatively great amount of current consumption in comparison with the first sensor in the carry state to determine the carry state 503/wear state 505 (see FIG. 5) of the terminal. Further, the processor 400 may determine whether the electronic device is worn when a value for a defined motion is obtained in the carry state. For example, the processor 400 may analyze the output data of the first sensor 420 in the carry state, and if it is determined that the output data of the first sensor 420 is a defined type of motion, may activate the second sensor 430 having a relatively great amount of current consumption, and may analyze the output data of the activated second sensor 430 to determine the carry state 503/wear state 505 of the electronic device.

In the not-carry state 501, the electronic device may use the second sensor to determine whether it is worn, upon detecting a defined type of motion (e.g., an action of wearing a watch on a wrist) by the first sensor. Further, in the wear state 505, the electronic device may use the sensor to determine whether it is worn, upon detecting a defined type of motion (e.g., an action of taking off the watch) by the first sensor.

According to an embodiment of the present disclosure, the first sensor 420 or the second sensor 430 may be a sensor which additionally exists outside the electronic device. For example, among IoT sensors located outside the electronic device, at least one sensor may operate as the first sensor 420 or the second sensor 430, or may confirm the first condition or the second condition by communicating detection information with the at least one sensor located outside.

In order to determine the not-carry/carry state and the carrying/wear state of the electronic device, the processor 400 may drive the first sensor 420 and the second sensor 430 step by step. The processor 400 may determine the state of the electronic device by comparing the output data of the first sensor 420 and the second sensor 430 and a corresponding first designated condition value or second designated condition value stored in the memory 410. The state of the electronic device may determine the first state (a motion of the electronic device, for example, a motion state and a posture or an action of wearing or detaching the electronic device) or the second state (for example, whether an object is in proximity, whether a user's bio-signal is generated, whether a user is authenticated).

The motion of the electronic device may differ depending on a method by which the user moves by carrying the electronic device. The memory 410 may store the first designated condition values corresponding to each method for moving. The processor 400 may analyze the output data of the first sensor 420 to obtain a value for the motion, and may determine a method for moving depending on the obtained motion value, and also may determine whether the electronic device is not carried or carried by using the first designated condition value depending on the determined method for moving and stored in the memory 410. The method for moving the electronic device may be a method of moving by carrying the electronic device by the user (e.g., a standstill, a walk, a run, and the like) or a method of moving together with the electronic device by using a form of transportation (e.g., a car, a bicycle, an airplane, and the like).

The memory 410 may store each of the first designated condition values as a reference value for determining a not-carry or carry state according to such a method for moving. For example, the first designated condition value may set a reference value for determining a motion obtained in the state of moving by being carried by the user and a reference value for determining the motion when the electronic device moves together with the user by using the form of transportation to respective different values. The processor 400 may analyze the output data of the first sensor 420 to confirm the method for moving the electronic device, and may access the memory 410 for the first designated condition value based on the method for moving to determine the not-carry or carry state of the electronic device. According to an embodiment of the present disclosure, if the first sensor 420 is a vibration sensor, a waveform of a vibration obtained through the vibration sensor when the electronic device moves in a car may be different from when it moves through a walking motion of the user. The first designated condition may be determined such that it moves by a car when the waveform of the vibration has a magnitude above a specific value. For example, the first sensor 420 may compare the obtained vibration magnitude and the first designated condition, and if the first condition is satisfied, may determine that the electronic device has moved by the car.

According to an embodiment of the present disclosure, in the carry state, the memory 410 may store the second designated condition value for determining whether the electronic device is in the wear state. If the electronic device is determined as the carry state, the processor 400 may activate the second sensor 430 (e.g., an IR sensor, a touch sensor, a biosensor, and the like). Thereafter, if the output data of the second sensor 430 satisfies the second designated condition value, the processor 400 may determine the state of the electronic device as the wear state. According to an embodiment of the present disclosure, in the carry state, the memory 410 may store the second designated condition value for determining whether the user of the electronic device is authenticated. For example, information related to biometric authentication information of the user, such as fingerprint information, iris information, vein information, skin information, and the like, may be stored. If the electronic device is determined as the carry state, the processor 400 may activate the second sensor 430 (e.g., a temperature sensor, a vein sensor, an iris sensor, a camera sensor, a voice sensor, and an electrode sensor for measuring skin impedance). Thereafter, if a value obtained from the activated second sensor 430 satisfies the second designated condition including the user authentication, the processor 400 may determine the state of the electronic device as the wear state and may change a security state of the electronic device. For example, if the user is an authenticated user, a lock screen may be released or an application for executing a payment related operation may be performed. According to an embodiment of the present disclosure, the authentication may be valid until the electronic device is determined in the wear state as a state of not wearing. For example, if the user of the electronic device does not wear the electronic device, the authentication may be initialized again, and the lock screen may be executed or the payment related application or operations may stop.

The wearable electronic device may have various wearing types (e.g., a watch type, a glasses type, an accessory type, a shirt type, a shoes type, and the like). For example, if the wearing type is a type of attaching to a body (e.g., a shirt type), a posture of the user's body may be identified, and if the wearing type is a type of attaching to an ear (e.g., a glasses type), a posture of a user's head may be identified, and if the wearing type is a type of attaching to a wrist (e.g., a watch type), a posture of a wrist and ankle of the user may be identified. In addition to the wearing type, a user's body motion level may be divided into multiple levels from a low level to a high level.

When wearing the electronic device, the electronic device may have a specific type of motion according to the wearing type. For example, when wearing a watch-type electronic device, the user may have a motion of wearing the electronic device on a wrist, and the like. In various embodiments of the present disclosure, when determining whether the electronic device is worn, it is confirmed whether a specific motion depending on the wearing type is generated, and if a value for the specific motion is obtained, the second sensor 430 may be activated. When determining whether it is worn in the carry state, it is first determined whether a motion for wearing the electronic device occurs through the first sensor 420, and if the second sensor 430 is activated when the value for the motion for wearing is obtained, current consumption can be decreased. Since an amount of current consumption of the second sensor 430 is relatively greater than an amount of current consumption of the first sensor 420, current consumption of the electronic device can be decreased by decreasing an activation time of the second sensor 430. The memory 410 may further store motion reference values for determining whether the electronic device is in the wear state when in the carry state according to the wear state of the electronic device.

Figure 5:
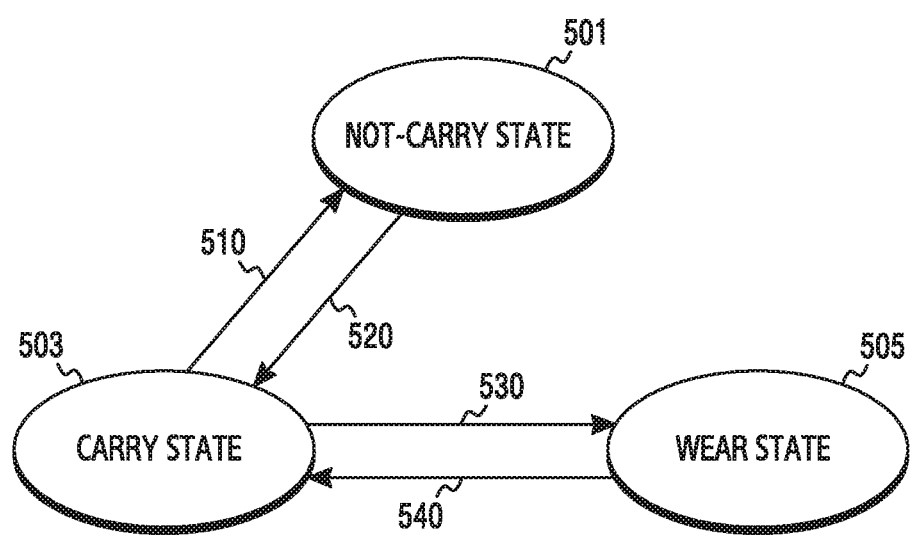
FIG. 5 illustrates a state of an electronic device according to various embodiments of the present disclosure.

FIG. 5 illustrates a state of an electronic device according to various embodiments of the present disclosure.

Referring to FIG. 5, according to an embodiment of the present disclosure, the state of the electronic device may be classified into three types, i.e., a first state to a third state. A not-carry state 501 may imply the first state in which the electronic device is not carried by a user. A carry state 503 may imply the second state in which the electronic device is carried by the user. A wear state 505 may imply the third state in which the electronic device is in contact with, in proximity to, or authenticated by the user.

The electronic device may first determine the not-carry state 501 or the carry state 503 of the electronic device by using the first sensor 420 having a small amount of current consumption. If the first condition is satisfied by using the first sensor, in operation 520, the electronic device may transition the state from the not-carry state 501 to the carry state 503. Thereafter, if it is determined as the carry state 503, the electronic device may activate the second sensor 430, and determine the carry state 503 or the wear state 505 of the electronic device by using the second sensor 430. Thereafter, if a specific motion is detected by the first sensor 420, the electronic device may activate the second sensor 430. Therefore, the current consumption amount of the electronic device can be decreased by decreasing an activation time of the second sensor 430 having a great amount of current consumption.

In case of the wear state 505, the electronic device may analyze output data of the second sensor 430 to transition to the carry state 503 in operation 540. For this, the electronic device may periodically or persistently activate the second sensor 430. If the electronic device recognizes that the electronic device is detached or is separated from the user by analyzing the output data of the second sensor 430 in the wear state 505, the electronic device may transition the state from the wear state 505 to the carry state 503. In addition, in the carry state 503, the electronic device may decrease current consumption of the electronic device by deactivating the second sensor 430. Further, the electronic device may deactivate the second sensor 430 in the wear state 505, and may analyze whether a value for a motion of cancelling the wearing of the electronic device by the user is obtained by analyzing the output data of the first sensor 420. In this case, a value for a specific motion of the electronic device can be obtained when the wearing of the electronic device is cancelled similarly to a case where the user wears the electronic device. For example, the value for the specific motion may include a specific motion for detaching the electronic device by the user. Therefore, the electronic device may activate the second sensor 430 in order to determine whether the wearing is cancelled after the specific motion is recognized for a case where the wearing of the electronic device is cancelled by the user. Therefore, in the wear state 505, the electronic device may recognize the specific motion for cancelling the wearing of the electronic device via the first sensor 420, and may determine whether the wearing of the electronic device is cancelled by activating the second sensor 430 upon detection of the specific motion, and thereafter if it is determined that the wearing is cancelled, may transition the state of the electronic device to the carry state 503 in operation 540. Further, in the carry state 503, the electronic device may deactivate the second sensor 430. In the carry state 503, the electronic device may determine the state of the portable device by analyzing data of the first sensor 420. If the output data of the first sensor 420 is maintained to be below a specific level (a first designated condition value) for more than a specific time duration, the electronic device may transition the state of the electronic device to the not-carry state 501 (i.e., the first state) in operation 510. Further, in the carry state 503, if the second designated condition value is satisfied by using the second sensor 430, the electronic device may transition the state of the electronic device to the wear state 505 in operation 530.

Figure 6:
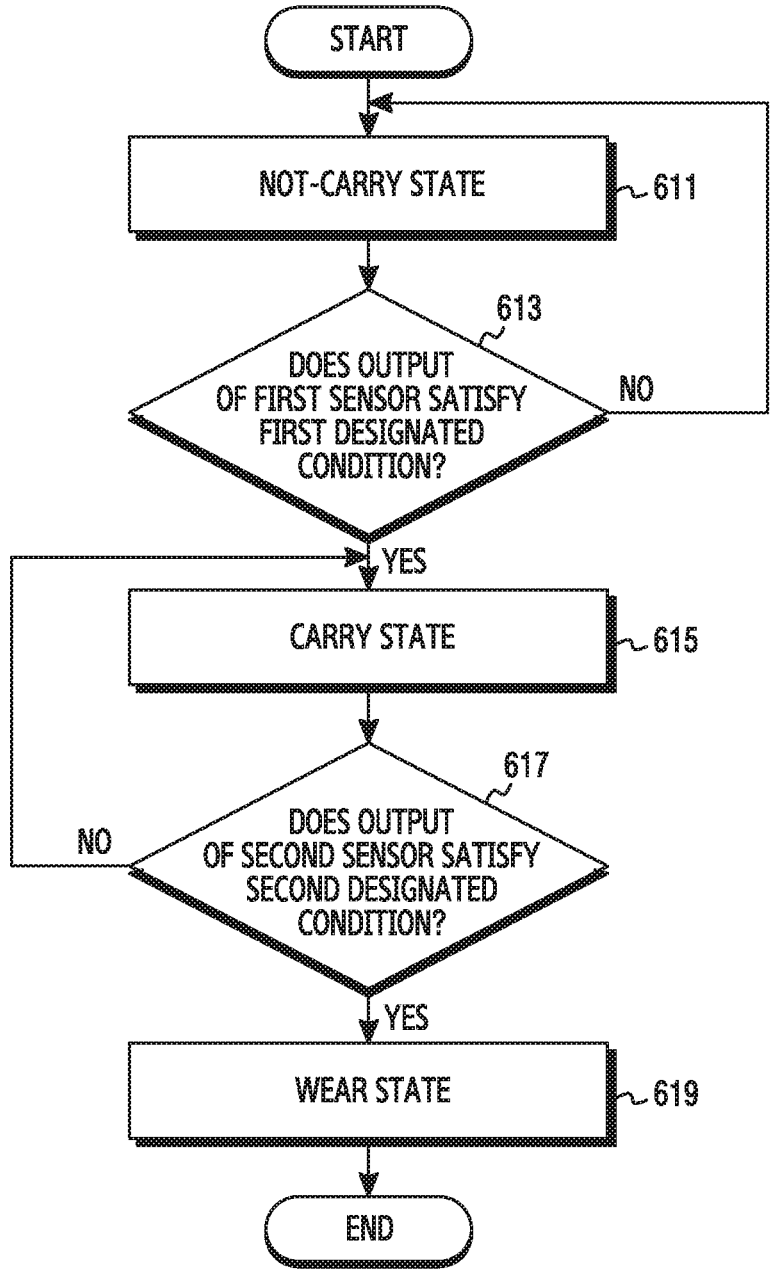
FIG. 6 illustrates a procedure of determining each state of an electronic device according to various embodiments of the present disclosure.

FIG. 6 illustrates a procedure of determining each state of an electronic device according to various embodiments of the present disclosure.

Referring to FIG. 6, the electronic device (e.g., the processor 400) may determine the state as the not-carry state 501 in operation 611. In the not-carry state 501, the electronic device may analyze whether the first designated condition is satisfied by analyzing output data of the first sensor 420 in operation 613. If the output data of the first sensor 420 does not satisfy the first designated condition, returning to operation 611, the electronic device may maintain the state of the electronic device to the not-carry state 501. However, if the output data of the first sensor 420 satisfies the first designated condition, proceeding to operation 615, the electronic device may determine the state as the carry state 503, and may perform a function of the carry state 503.

In the carry state 503, the electronic device may examine whether the electronic device is worn by using the output data of the second sensor 430. If it is determined as the carry state 503, the electronic device may activate the second sensor 430. In operation 617, the electronic device analyzes the output data of the second sensor 430, and if the pre-set second condition is not satisfied, returning to operation 615, may maintain the carry state 503. However, if the output data of the second sensor 430 satisfies the second designated condition, the electronic device may recognize this in operation 617, and may determine the state of the electronic device as the wear state 505 in operation 619.

The wearable electronic device according to the various embodiments of the present disclosure may first determine the not-carry state 501 or the carry state 503 of the terminal by using the first sensor 420 having a small amount of current consumption, and thereafter if it is determined as the carry state 503, may determine whether the electronic device is worn by using the second sensor 430 having a great amount of current consumption. Therefore, when the state of the electronic device is determined, the not-carry state 501/carry state 503/wear state 505 of the electronic device may be determined with low power while minimizing the driving of the second sensor 430 having a great amount of current consumption similarly to the proximity, touch, or bio-signal detection sensor.

Figure 7:
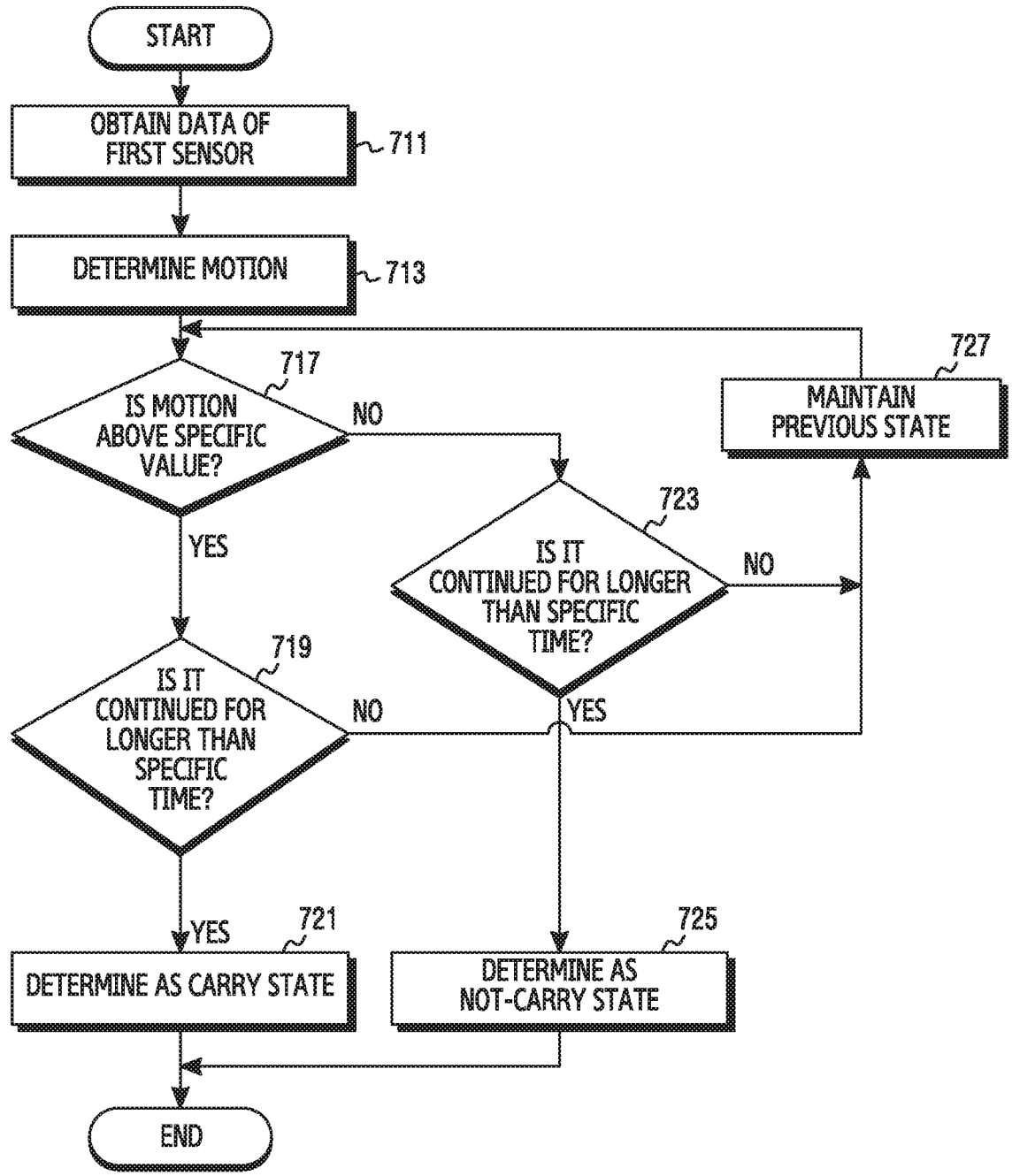
FIG. 7 illustrates a procedure of determining a not-carry state and a carry state of an electronic device according to various embodiments of the present disclosure.

FIG. 7 illustrates a procedure of determining a not-carry state and a carry state of an electronic device according to various embodiments of the present disclosure.

Referring to FIG. 7, the electronic device may obtain output data of the first sensor 420 in operation 711, and may determine a motion in operation 713. The electronic device may determine at least one motion based on the output data of the first sensor 420, which is output in accordance with an activity of a user who carries the electronic device. For example, the electronic device may determine at least one motion based on the output data of the first sensor 420, which is output, for example, according to a case where the user who carries the electronic device is in a state of standstill or walking or running, and the like. Further, the electronic device may determine various types of motions according to a form of transportation even if the user who carries the electronic device moves using the specific form of transportation. For example, the electronic device may determine different types of motions according to a case where the user who carries the electronic device is riding a bicycle or a car or an airplane. In operation 713, the electronic device may determine the motion.

Thereafter, in operation 717, the electronic device may examine whether a value for a motion obtained based on the output data of the first sensor 420 is above a specific value. In this case, if the value for the obtained motion is above the specific value, in operation 719, the electronic device may examine whether the motion which is above the specific value is maintained for a set time. In this case, if the value for the motion which is above the specific value is maintained for a time longer than the set time, the electronic device may recognize this in operation 719, and may determine the state of the electronic device as the carry state 503 in operation 721.

However, if the value for the motion of the output data of the first sensor 420 is below the specific value, the electronic device may recognize this in operation 717, and may examine whether the value for the motion which is below the specific value is maintained for the time longer than the set time in operation 723. In this case, if the value for the motion which is below the specific value of the electronic device is maintained for the time greater longer than the set time, the electronic device may recognize this in operation 723, and may determine the state of the electronic device as the not-carry state 501 in operation 725.

Further, if the value for the motion which is above or below the specific value is not maintained for the time longer than the set time, the electronic device may recognize this in operation 723, and may maintain the previous state in operation 727. For example, if the motion of the electronic device, which is recognized by the first sensor 420, is not maintained for the set time and is changed to be above or below the specific value, the state of the electronic device may be maintained to the previously determined state.

As described in FIG. 7, the electronic device may monitor a current motion state of the electronic device, a history of a user's body motion level change from a current time to a specific previous time, a user's movement situation, and the like, based on the first sensor 420, and may determine a state of the electronic device based on the monitoring result. Herein, the first sensor 420 may be at least one of an acceleration sensor and/or a gyro sensor. If a value for a motion recognized by the monitoring of the first sensor 420 is above a specific value (i.e., a pre-set threshold) and if the value for the motion which is above the specific value is continued for longer than a specific time, the electronic device may determine the state of the electronic device as the carry state 503. However, if the value for the motion obtained by the monitoring of the first sensor 420 is below the specific value and if the value for the motion which is below the specific value is continued for longer than the specific time, the electronic device may determine the state of the electronic device as the not-carry state 501.

In this case, the specific value may be set to a different value according to a motion type of the electronic device. For example, the specific value may be set variably according to a motion type (a walk, a run, a standstill, and the like) of the user who carries the electronic device, and may be set variably according to a movement type (e.g., a standstill, a bicycle, a car, a train, an airplane, and the like) of the user who carries the electronic device. When the value for the motion is obtained from the first sensor 420, the electronic device may determine the user's motion type and movement type based on the obtained motion value, and may set a specific value according to the determined result. The electronic device according to the various embodiments of the present disclosure may pre-store reference values for motions based on the user's motion type and movement type in the memory 410. Further, when the motion of the first sensor 420 is recognized, the user's motion type and/or movement type may be determined by comparing with the reference values stored in the memory 410. Furthermore, the memory 410 may analyze output data of the first sensor 420 and store data of the first designated condition for determining the not-carry state 501 or the carry state 503.

The first designated condition may include a specific threshold variably determined based on the user's motion type and movement type and a set time (a specific time) for determining whether a state is changed. If a value for a motion which is above a specific level (a specific value) is persistently detected for longer than a specific time (if the first designated condition is satisfied), the electronic device may determine the state of the electronic device as the carry state 503. If the value for the motion which is below the specific level (the specific value) is persistently detected for longer than the specific time (if the first designated condition is not satisfied), the electronic device may determine the state thereof as the not-carry state 501. Further, if a motion change of the electronic is significant (e.g., if the motion is maintained to be above a specific value for longer than a specific time or is not maintained to be below the specific value) in a state where the first designated condition is not satisfied, the electronic device may maintain the previously determined state of the electronic device.

Figure 8:
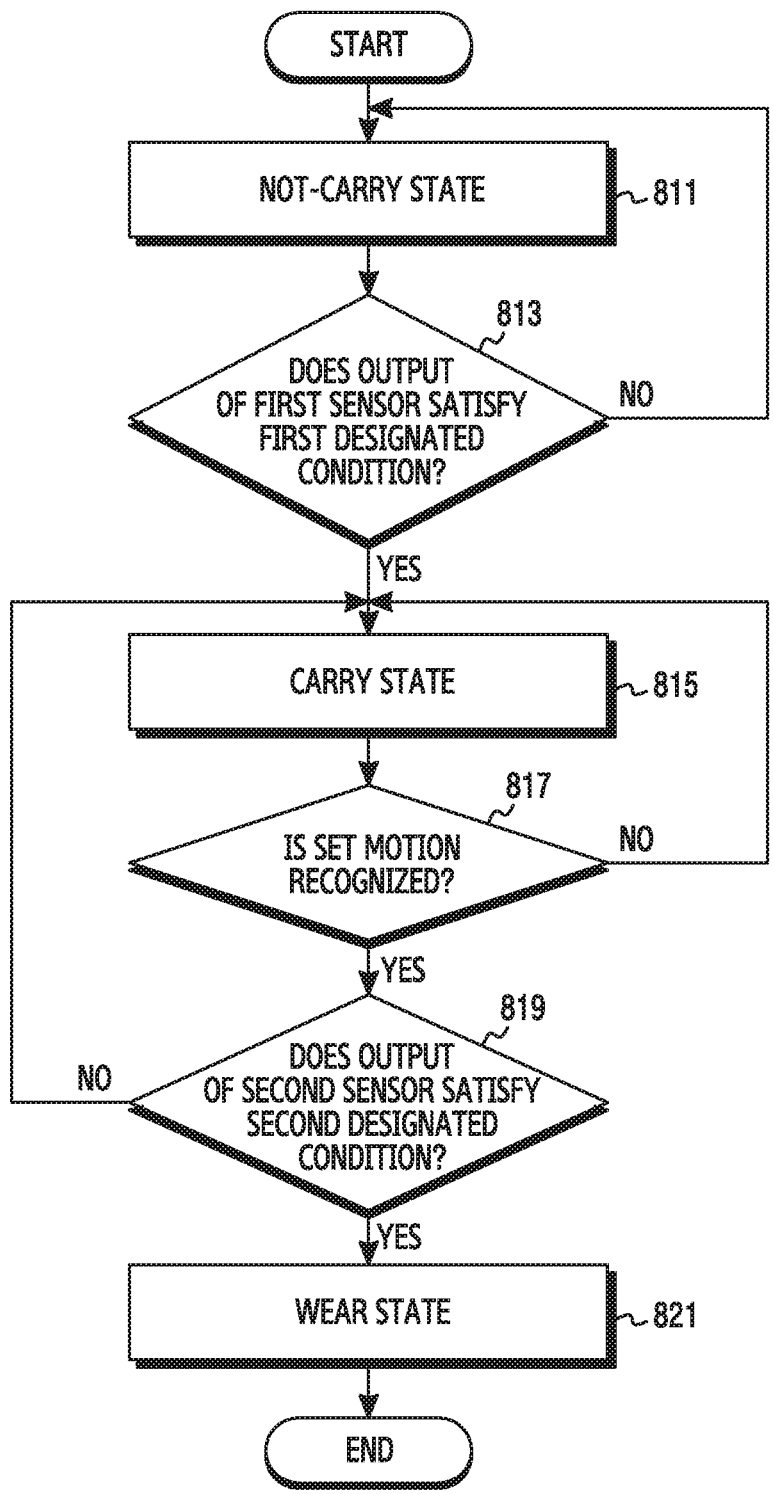
FIG. 8 illustrates a procedure of determining a wear state of an electronic device according to various embodiments of the present disclosure.

FIG. 8 illustrates a procedure of determining a wear state of an electronic device according to various embodiments of the present disclosure.

Referring to FIG. 8, in operation 811, the electronic device may be determined as the not-carry state 501, and may obtain output data of the first sensor 420 in the not-carry state 501. In operation 813, the electronic device may analyze a value for a motion based on the output data of the first sensor 420, and may compare and analyze the value for the motion recognized by the electronic device and the first designated condition. In this case, if the value for the motion of the electronic device satisfies the first designated condition, in operation 815, the electronic device may determine the state of the electronic device as the carry state 503.

In the carry state 503, the electronic device may examine whether to transition to the wear state 505. In the carry state 503, the first sensor 420 is in an active state and the second sensor 430 is an inactive state. When in the carry state 503, in operation 817, the electronic device may analyze the output data of the first sensor 420 and examine whether the value for the motion of the electronic device is obtained as a value for a set motion. Herein, the value for the set motion may be a value for a motion obtained when the user wears the electronic device. The wearable electronic device may have various types, such as a watch type, a glasses type, an accessory type, a shirt type, a shoes type, and the like. Therefore, when the electronic device is worn, a corresponding motion may occur according to the type of the electronic device. For example, a watch-type electronic device to be attached to a wrist may have a motion in which the user wears it on a wrist. A glasses-type electronic device may have a motion in which the user wears glasses.

If the unique motion of wearing the electronic device occurs in the carry state 503, the electronic device may recognize this in operation 817, and may analyze the output data of the second sensor 430 to determine whether it is worn in operation 819. For example, if the output data of the second sensor 430 satisfies the second designated condition in operation 819, it may be determined in operation 821 that the electronic device transitions to the wear state 505. According to an embodiment of the present disclosure, the second designated condition may be a condition in which the second sensor 430 recognizes that the user is in proximity to or in contact with the electronic device or a condition in which whether the user is an authenticated user of the electronic device is determined.

Figure 9:
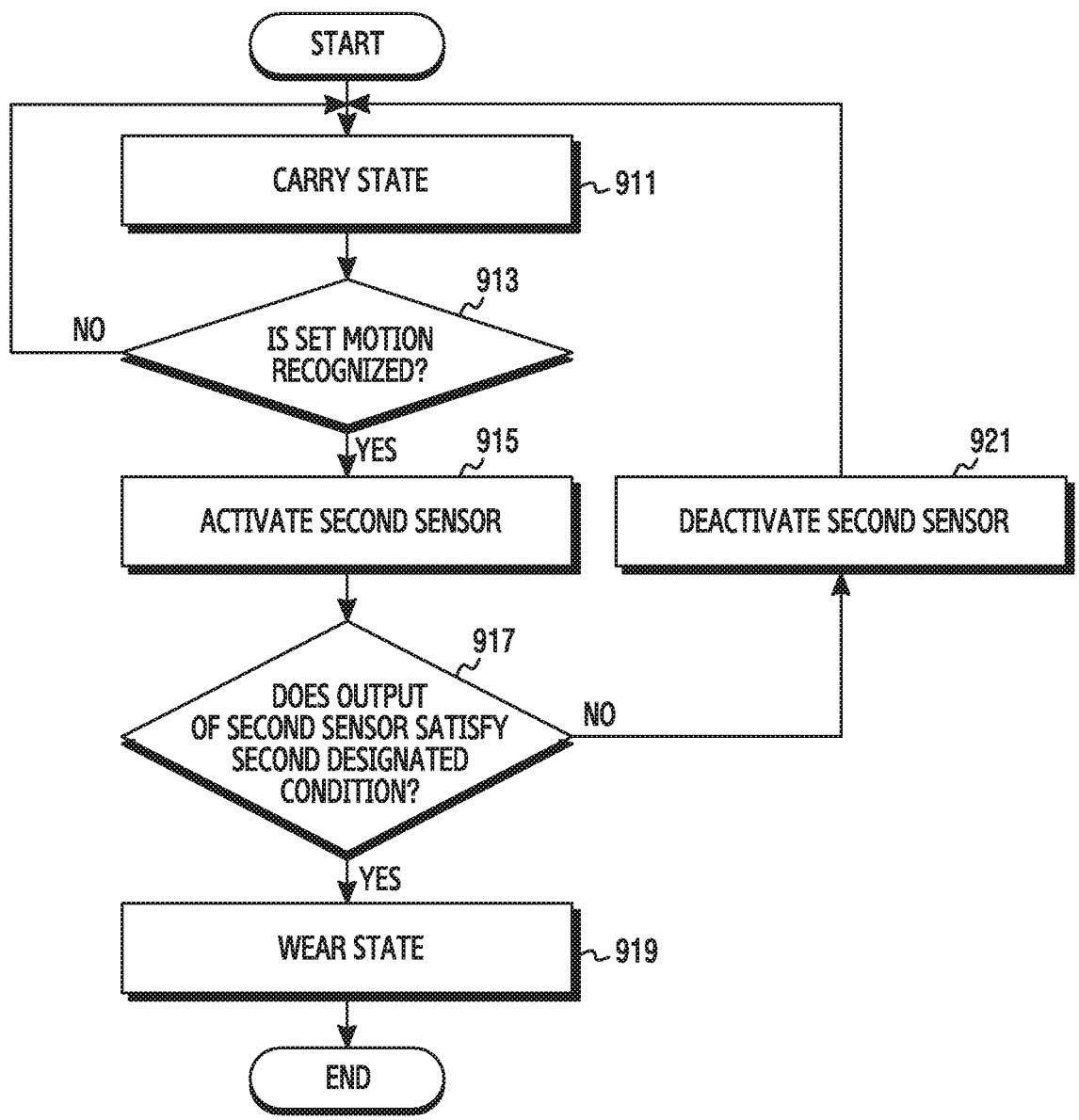
FIG. 9 illustrates a procedure of determining a wear state by an electronic device in a carry state according to various embodiments of the present disclosure.

FIG. 9 illustrates a procedure of determining a wear state by an electronic device in a carry state according to various embodiments of the present disclosure.

Referring to FIG. 9, in operation 911, the electronic device may be determined as the carry state 503. In the carry state 503, the electronic device may obtain output data of the first sensor 420, and in operation 913, may recognize a set motion for wearing the electronic device by analyzing the output data of the first sensor 420. Upon detection of the set motion in operation 913, the electronic device may activate the second sensor 430 in operation 915, and may determine whether the output data of the activated second sensor 430 satisfies the second designated condition in operation 917. In this case, if the output data of the second sensor 430 satisfies the second designated condition, the electronic device may transition the state of the electronic device to the wear state 505 in operation 919. However, if the output of the second sensor 430 does not satisfy the second designated condition in operation 917, the electronic device may deactivate the second sensor 430 in operation 921, and may return to the carry state 503 of the operation 911.

If the state of the portable terminal is determined as the carry state 503, the electronic device may identify the carry state 503, the wear state 505, or the authentication state of the electronic device by using the second sensor 430. However, the second sensor 430 may be a sensor having a greater amount of current consumption than the first sensor 420. Therefore, since the amount of current consumption is great whenever the second sensor 430 is driven, the electronic device can decrease current consumption by decreasing the driving of the second sensor 430. The electronic device according to the various embodiments of the present disclosure may determine whether the electronic device is worn while minimizing the number of times of attempting the driving of the sensor of the second sensor 430. The electronic device may first monitor whether a motion of a pre-set type occurs in the carry state 503, and if the set motion is recognized, may drive the second sensor 430. For example, the electronic device may deactivate the second sensor 430 in the carry state 503, and if the motion for wearing the electronic device is recognized, may activate the second sensor 420 to determine whether the user wears the electronic device.

The second sensor 430 may include at least one of a proximity sensor, a touch sensor, a biosensor (e.g., an HR sensor), a temperature sensor, a vein sensor, an iris sensor, a camera sensor, a voice sensor, and an electrode sensor for measuring skip impedance. The electronic device may analyze the output data of the second sensor 430, and upon recognizing the user or the proximity, touch, and biometrics of the user of the electronic device, may determine that the second designated condition is satisfied. Further, the electronic device may analyze the output data of the second sensor 430 in two steps to determine whether it is worn. For example, the electronic device may confirm whether it is primarily in proximity by using a proximity or touch sensor, and if it is determined as being proximity, may determine whether it is finally worn by using a biosensor.

Figure 10:
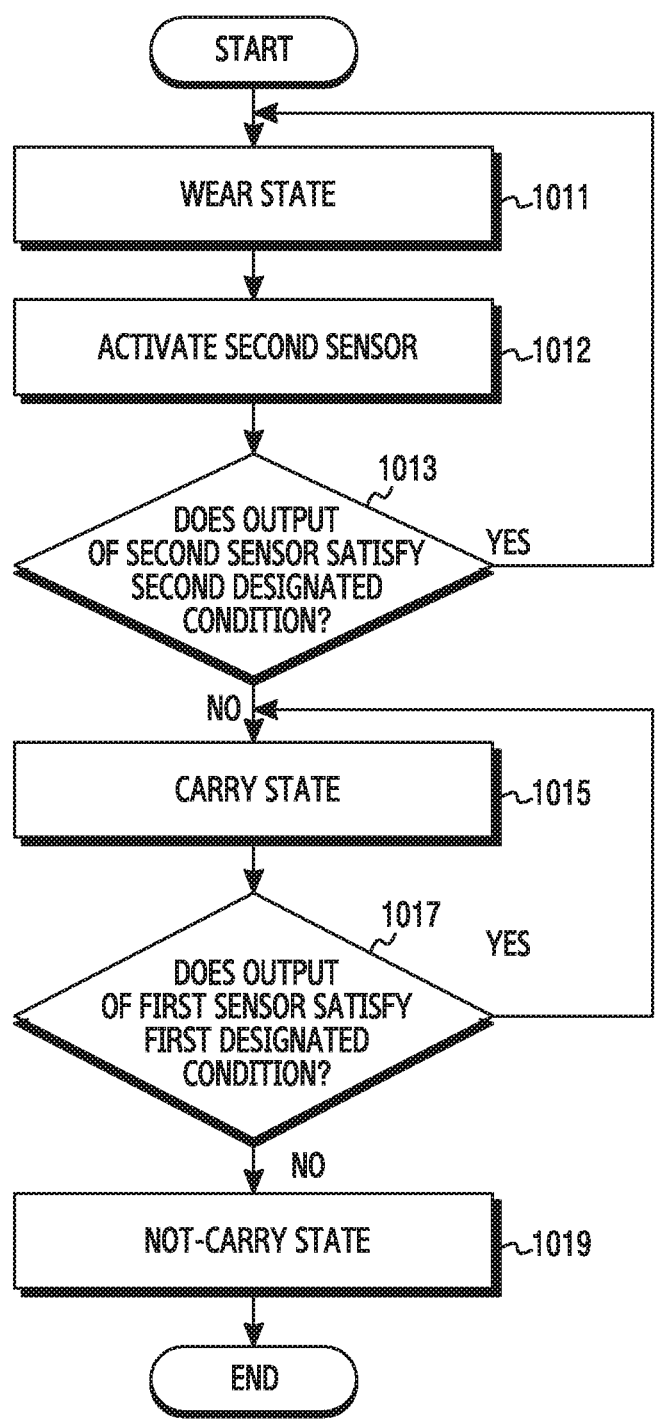
FIG. 10 illustrates a method of determining each state of an electronic device according to an embodiment of the present disclosure.

FIG. 10 illustrates a method of determining each state of an electronic device according to an embodiment of the present disclosure.

Referring to FIG. 10, in operation 1011, the electronic device may determine the wear state 505. In operation 1012, in order to determine in the wear state whether the state is changed, the electronic device may periodically or persistently activate the second sensor 430. When in the wear state 505, in operation 1013, the electronic device may analyze output data of the second sensor 430 to determine whether the second designated condition is changed. In this case, the second designated condition (e.g., a state where the user is in proximity to the electronic device or touches the electronic device or a state where biometric information of the user can be recognized), returning to operation 1011, may maintain the wear state 505. However, if the output data of the second sensor 430 does not satisfy the second designated condition, the electronic device may recognize this in operation 1013, and may transition to the carry state 503 in operation 1015.

In operation 1015, the electronic device may determine the state as the carry state 503. In the carry state 503, the electronic device may obtain the output of the first sensor 420, and in operation 1017, may examine whether the output of the first sensor 420 satisfies the first designated condition. If the output of the first sensor 420 satisfies the first designated condition, the electronic device may determine the state as the carry state 503 in operation 1015. However, if the output of the first sensor 420 does not satisfy the first designated condition, the electronic device may recognize this in operation 1017, and may transition the state of the electronic device to the not-carry state 501 in operation 1019.

Figure 11:
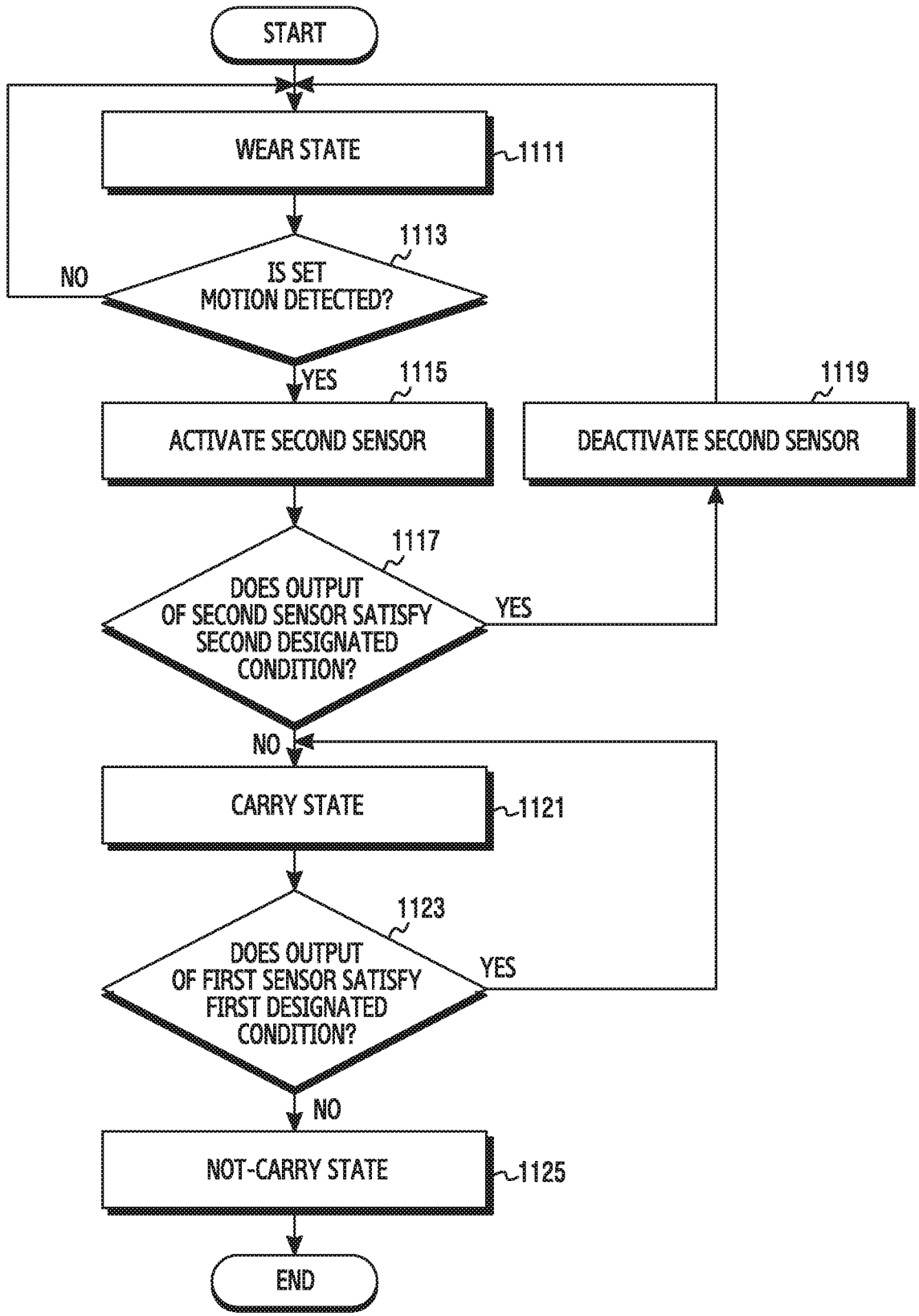
FIG. 11 illustrates a method of determining a state of an electronic device in a wear state by the electronic device according to various embodiments of the present disclosure.

FIG. 11 illustrates a method of determining a state of an electronic device in a wear state by the electronic device according to various embodiments of the present disclosure.

Referring to FIG. 11, in operation 1111, the electronic device may determine the state as the wear state 505. In the wear state 505, the electronic device may deactivate the second sensor 430. In the wear state 505 in which the second sensor 430 is deactivated, the electronic device may analyze the output of the first sensor 420 to examine whether a motion for cancelling the wearing of the electronic device occurs in operation 1113. The motion for cancelling the wearing of the electronic device may be the same as or similar to the motion of wearing the electronic device. Upon recognizing a set motion in operation 1113, the electronic device may activate the second sensor 430 in operation 1115, and may examine whether the output of the second sensor 430 satisfies the second designated condition in operation 1117. If the output of the second sensor 430 satisfies the second designated condition, the electronic device may determine the state as the wear state 505. Therefore, if the output of the second sensor 430 satisfies the second designated condition, the electronic device may deactivate the second sensor 430 in operation 1119, and may maintain the wear state 505 of operation 1111. However, if the output of the second sensor 430 does not satisfy the second designated condition, the electronic device may recognize this in operation 1117, and may transition to the carry state 503 in operation 1121.

In operation 1121, the electronic device may determine the state as the carry state 503. If it is determined as the carry state 503, the electronic device may examine whether the output of the first sensor 420 satisfies the first designated condition in operation 1123. If the output of the first sensor 420 satisfies the first designated condition, the electronic device may determine the state as the carry state 503 in operation 1121. Otherwise, if the output of the first sensor 420 does not satisfy the first designated condition, the electronic device may transition the state of the electronic device to the not-carry state 501 in operation 1125.

Figure 12:
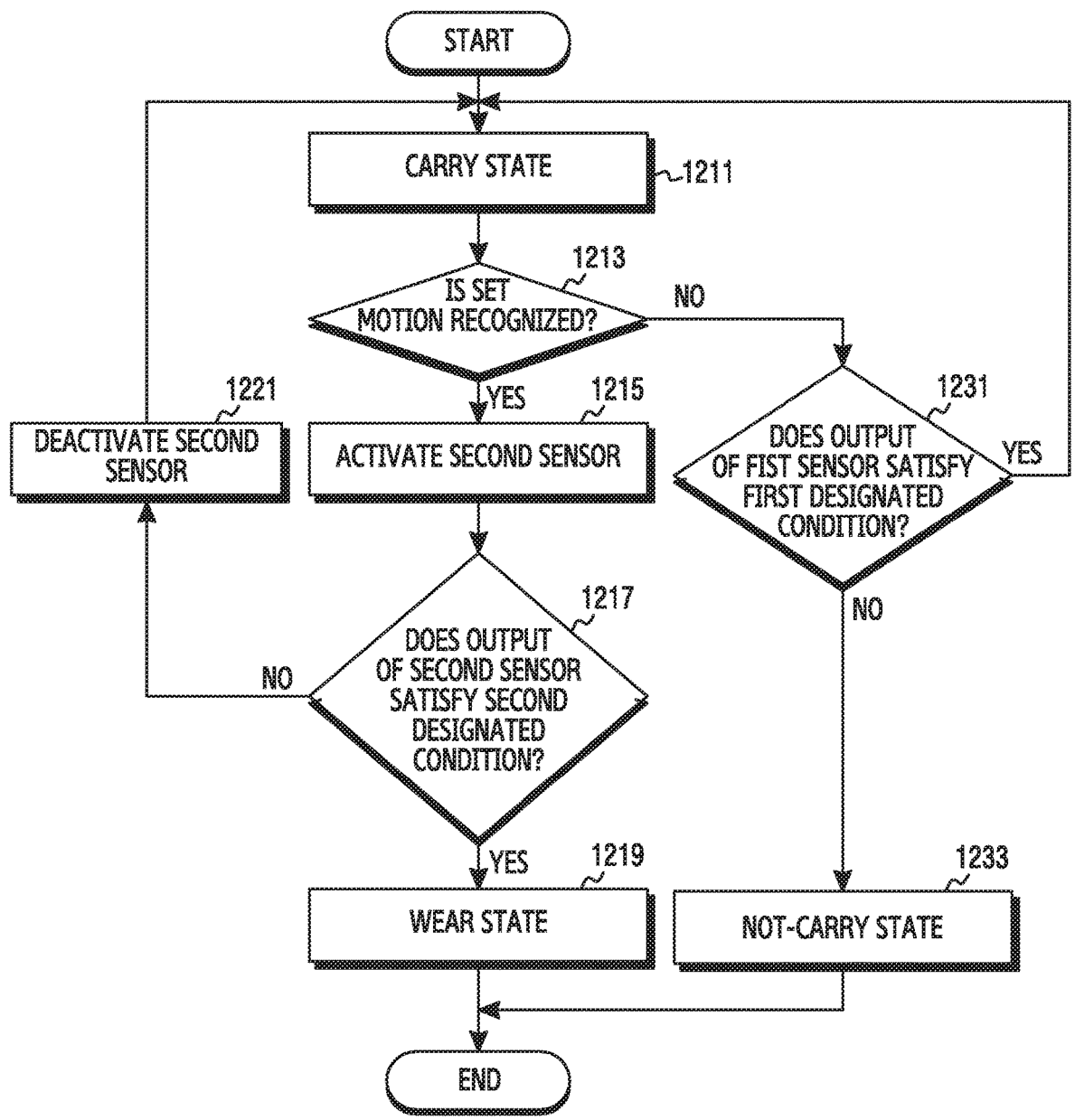
FIG. 12 illustrates a method of processing an operation of an electronic device in a carry state according to various embodiments of the present disclosures.

FIG. 12 illustrates a method of processing an operation of an electronic device in a carry state according to various embodiments of the present disclosures.

Referring to FIG. 12, the electronic device may be determined as the carry state 503 in operation 1211. In the carry state 503, the electronic device may analyze the output of the first sensor 420 to transition to the not-carry state 501 or the wear state 505. If a set motion (e.g., a motion for wearing the electronic device) is recognized by analyzing the output data of the first sensor 420 in operation 1213, the electronic device may activate the second sensor 430 in operation 1215. After activating the second sensor 430, the electronic device may analyze the output data of the second sensor 430 in operation 1217, and if the output data of the second sensor 430 satisfies the second designated condition, may transition the state of the electronic device to the wear state 505 in operation 1219. However, if the output data of the second sensor 430 does not satisfy the second designated condition in operation 1217, the second sensor 430 may be deactivated in operation 1221, and the carry state 503 of operation 1211 may be maintained.

If the set motion is not detected in operation 1213, the electronic device may analyze the output of the first sensor 420 in operation 1231, and thereafter if the output of the first sensor 420 does not satisfy the first designated condition (e.g., if a motion is maintained for a time which is set to be below a specific value), the electronic device may transition the state of the electronic device to the not-carry state 501 in operation 1233.

Further, if the set motion is not recognized in the carry state 503 and if the output of the first sensor 420 satisfies the first designated condition, the electronic device may recognize this in operation 1231, and may maintain the carry state 503 of operation 1211.

When the wear state 505 of the electronic device is determined, accuracy may deteriorate if only an acceleration sensor is used to determine whether the terminal is attached. The electronic device according to the various embodiments of the present disclosure may divide the state of the electronic device into three states, i.e., the not-carry state 501, the carry state 503, and the wear state 505. The electronic device may first identify the not-carry state 501 or the carry state 503 by using the first sensor 420 (for example, including at least one of an acceleration sensor, a gyro sensor, a geo magnetic sensor) for recognizing the motion of the electronic device, and if it is determined as the carry state 503, may identify the carry state 503 or the wear state 505 by using the second sensor 430 (for example, including at least one of a proximity sensor, a touch sensor, and a biosensor). Further, when identifying the carry state 503 and the wear state 505, the electronic device may first use the first sensor 420 to determine whether a motion occurs which is set to wear the electronic device or to cancel the wearing, and may determine the state of wearing or cancelling of the wearing by activating the second sensor upon recognizing the set motion. Therefore, the not-carry state, the carry state, and the wear state 505 of the electronic device can be determined more accurately, and driving of the second sensor 430 having a relatively greater amount of current consumption than the first sensor 420 can be minimized, thereby being able to extend a usage time of the electronic device.

Figure 13:
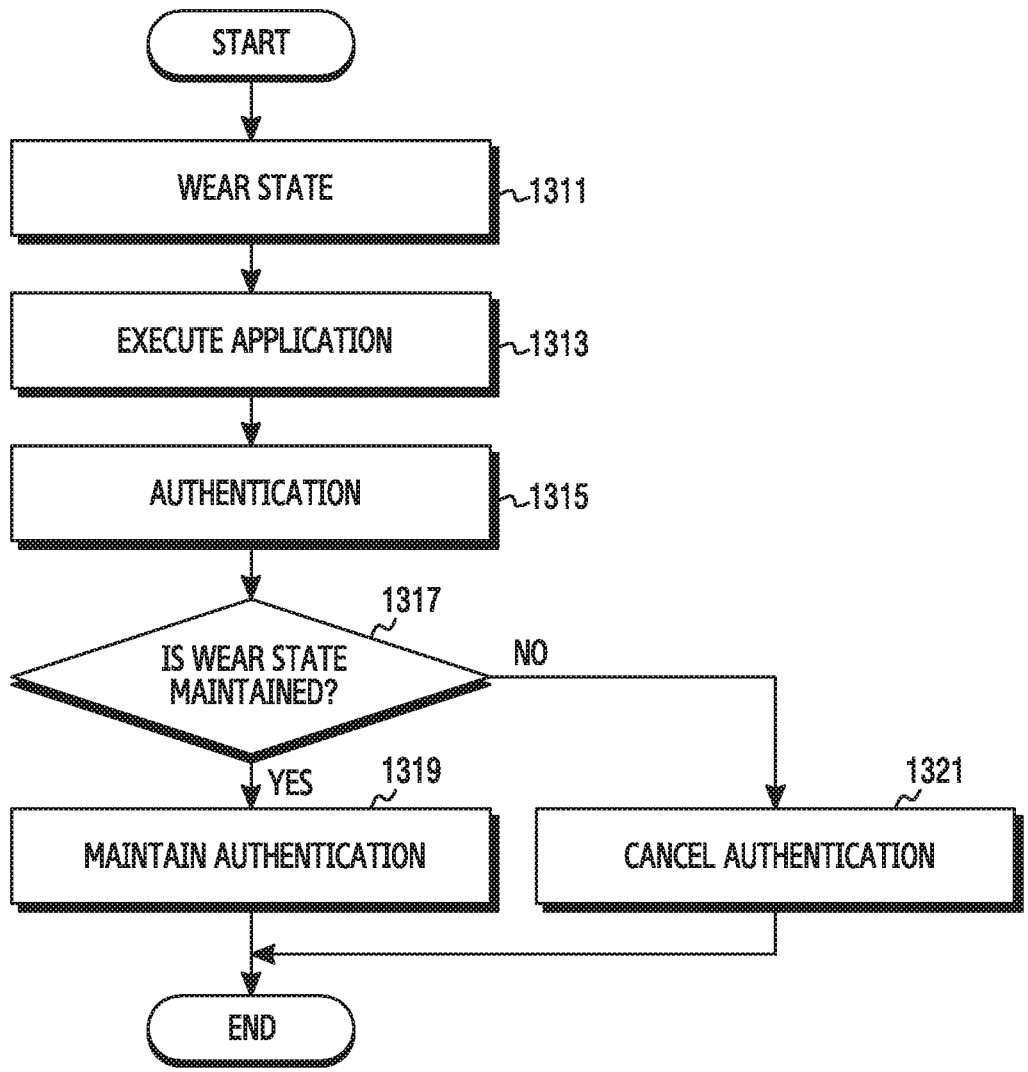
FIG. 13 illustrates a procedure of controlling authentication by an electronic device in a wear state according to various embodiments of the present disclosure.

FIG. 13 illustrates a procedure of controlling authentication by an electronic device in a wear state according to various embodiments of the present disclosure.

Referring to FIG. 13, the electronic device may recognize that the state of the electronic device is the wear state 505 in operation 1311, and may execute at least one application in operation 1313. The at least one application may be an application for mobile payment. After the application is executed, if an authentication procedure is necessary, the electronic device may perform the authentication procedure in operation 1315. The authentication procedure may be performed by using at least one of a fingerprint recognition, a face recognition, a password input, a pattern input, and the like.

According to an embodiment of the present disclosure, in the authentication of operation 1315, the user may be authenticated based on user's biometric authentication information obtained from the second sensor 430 (e.g., a temperature sensor, a vein sensor, an iris sensor, a camera sensor, a voice sensor, and an electrode sensor for measuring skin impedance). The electronic device may determine whether the wear state is maintained in operation 1317. If the wear state 505 of the electronic device is maintained, the authentication state may be maintained in operation 1319. For example, if the authentication is performed in a state of wearing the electronic device, an additional authentication procedure may not be performed while the wearing of the electronic device is maintained or may be performed at a low level by changing an authentication level.

Meanwhile, if it is determined in operation 1317 that the wear state 505 is maintained, that is, if the state of the electronic device transitions from the wear state 505 to the carry state 503, the authentication is cancelled in operation 1321 to restrict an operation for a specific function among functions of the terminal. Therefore, unnecessary current consumption in the terminal can be minimized in a not-wear state, and a damage caused by an unauthorized use of the terminal by others can be minimized.

Figure 14:
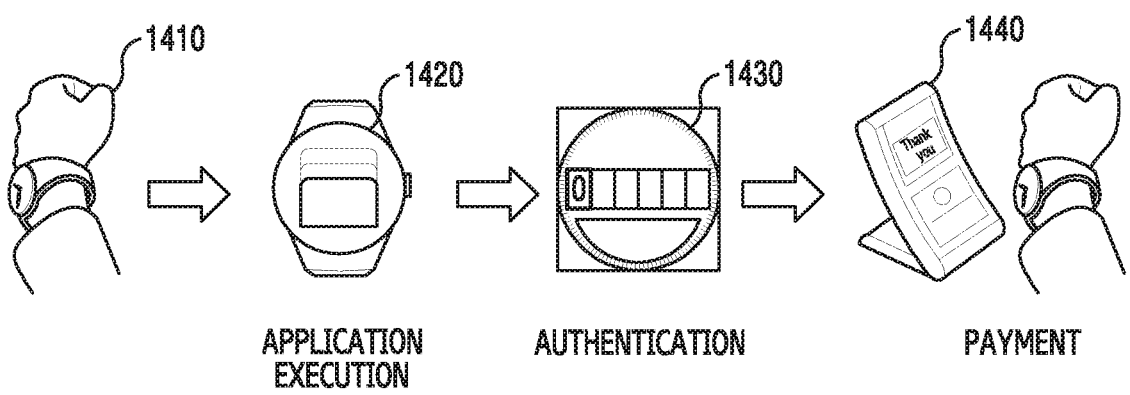
FIG. 14 illustrates a method of performing a payment operation by an electronic device in a wear state according to various embodiments of the present disclosure.

FIG. 14 illustrates a method of performing a payment operation by an electronic device in a wear state according to various embodiments of the present disclosure.

Referring to FIG. 14, when the user uses the electronic device to perform a payment function, the electronic device may recognize the wear state 505 in operation 1410, and may execute an application for at least one payment in operation in 1420. After the application is executed in operation 1420, if an authentication procedure is necessary, the electronic device may perform the authentication procedure in operation 1403. The authentication procedure may be performed by using at least one of a fingerprint recognition, a face recognition, a password input, a pattern input, and the like. According to an embodiment of the present disclosure, in the authentication of operation 1430, the user may be authenticated based on user's biometric authentication information obtained from the second sensor 430 (e.g., a temperature sensor, a vein sensor, an iris sensor, a camera sensor, a voice sensor, and an electrode sensor for measuring skin impedance). While the wear state 505 is maintained, the electronic device may perform the payment operation without an additional authentication procedure in operation 1440. Therefore, if the payment can be achieved using a first one-time password, and the like, after the electronic device is worn, the payment can be continuously achieved without an operation of an additional device, such as a password, and the like, while the wear state 505 is maintained. Therefore, inconvenience of inputting the password, and the like, whenever the payment is achieved in a state of wearing the electronic device can be minimized. Further, when the electronic device transitions from the wear state 505 to the carry state 503, a user's damage which may occur due to an unauthorized use of the terminal by others can be minimized in such a manner that the payment is allowed only when a password, and the like, is input again when a payment situation occurs at a later time.

Figure 15:
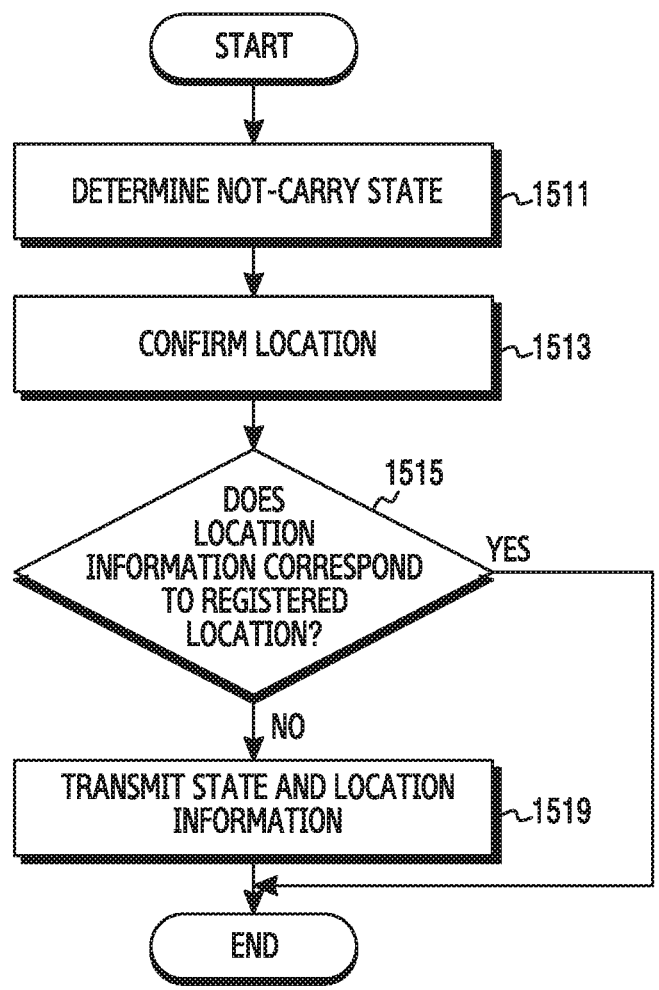
FIG. 15 illustrates a procedure of transmitting location information by an electronic device to another device according to various embodiments of the present disclosure.

FIG. 15 illustrates a procedure of transmitting location information by an electronic device to another device according to various embodiments of the present disclosure.

Referring to FIG. 15, the electronic device in the not-carry state 501 may transmit its location and information related to the not-carry state 501 to another electronic device or a server. The electronic device may analyze the output of the first sensor 420, and if a value for a motion which is below a specific value is maintained for longer than a set time, may determine the not-carry state 501 in operation 1511. The electronic device may register the location of the electronic device in the memory 410. The registration location may be a location of an office, home, and the like. Further, the electronic device may store an address of another electronic device or server, and the like, for transmitting the location of the electronic device in the not-carry state and the information related to the not-carry state 501. If it is determined as the not-carry state 501, the electronic device may determine a current location in operation 1513, and may compare whether a location determined by using the location information registered in the memory 410 is the registered information. The electronic device may determine the current location by using the communication module 220. In this case, if a location in the not-carry state is not the location of the registered place, the electronic device may recognize this in operation 1515, and may transmit the location information of a place in the not-carry state and the information related to the not-carry state 501 to another electronic device by using the communication module 220 in operation 1519. For example, if the place in the not-carry state is not the registered place, the electronic device may capture the current location by driving a camera, and may record a sound of the current location by driving a microphone. Further, if the place in the not-carry state is not the registered place, the related information may be transmitted to another registered electronic device or server together with the location information.

Although a wearable electronic device is described in FIG. 15 as an example, the location in the not-carry state and related information may be transmitted to another terminal or server in the same manner also in a portable electronic device (e.g., a mobile phone, a laptop computer, and the like).

If some electronic devices are in the not-carry state 501/carry state 503/wear state 505 among a plurality of portable electronic devices that can perform communication as described above, a location of an electronic device in the not-carry state 501 and information related to the not-carry state 501 may be transmitted to one or more different electronic devices in the carry state or the wear state 505 or may be transmitted to a pre-set server. Further, information on the not-carry state 501/carry state 503/wear state 505 may be delivered directly between terminals or may be delivered via an additional server.

If the not-carry state 501 occurs in some electronic devices among the plurality of electronic devices and if a location in the not-carry state is not a pre-set place, information related to the location of the electronic device in the not-carry state may be delivered to another portable electronic device or an electronic device in a wear state, thereby being able to prevent a loss of the electronic device not carried.

Among electronic devices primarily carried by a user simultaneously, if some electronic devices are determined as being not carried and some devices are determined as being carried by learning a wearing/carry situation of the plurality of electronic devices, a loss of a terminal not carried can be prevented through a user alert. For example, in a case where a user who carries a mobile phone together with a BT earphone suddenly moves by carrying only the mobile phone and by not carrying the BT earphone or in an opposite case, the electronic device in the not-carry state may alert this to another electronic device to prevent a situation of losing the BT earphone or the mobile phone.

If information, such as a text/call/alert is generated in the electronic device in the not-carry state, the information may be delivered to the electronic device in the carry state or the wear state 505, so that the user can be prevented from missing the text/call/alert.

Figure 16:
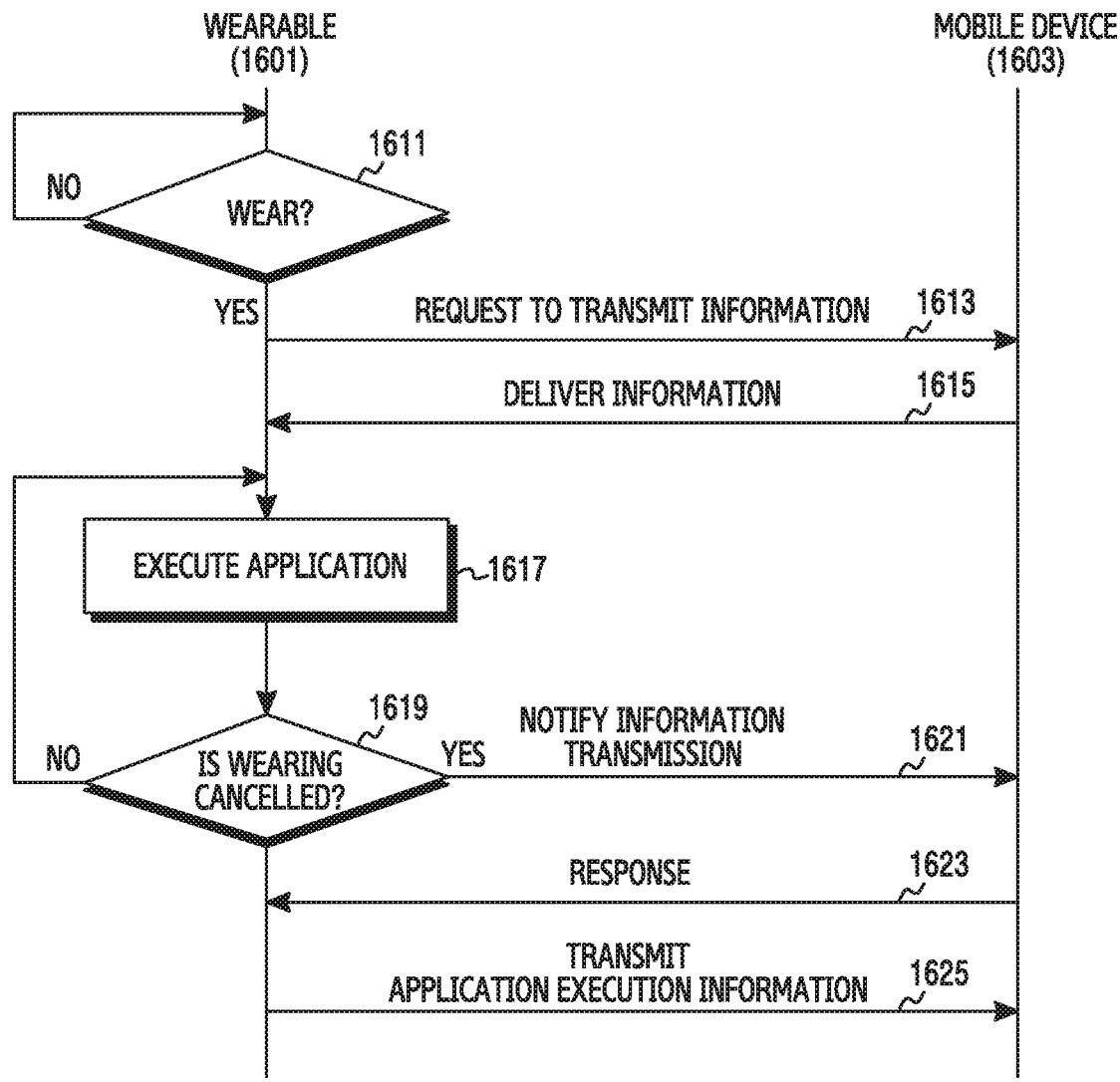
FIG. 16 illustrates a procedure of transmitting information by an electronic device in a not-carry state to another device according to various embodiments of the present disclosure.

FIG. 16 illustrates a procedure of transmitting information by an electronic device in a not-carry state to another device according to various embodiments of the present disclosure.

Referring to FIG. 16, a wearable electronic device may receive an information service continuously irrespective of a change of the electronic device by transmitting information to a different electronic device or by receiving information from the different electronic device according to a state change. A wearable device 1601 and a mobile device 1603 will be described as an example of a wearable electronic device and a portable electronic device.

When the electronic device 1601 transitions to the wear state 505, the electronic device 1601 may recognize this in operation 1611, and may request to the different electronic device 1603 to transmit executed information in operation 1613. In addition, if the electronic device 1603 transmits information in response thereto, the electronic device 1601 may receive the information of the electronic device 1603 in operation 1615, and may continuously execute a corresponding application by using the received information in operation 1617.

Further, if it transitions from the wear state 505 to the carry state 503, the electronic device 1601 may recognize this in operation 1619, and may report that there is information to be delivered to the connectable electronic device 1603 in operation 1621. Furthermore, if the electronic device 1603 transmits a response message, the electronic device 1601 may receive this in operation 1623, and thereafter may transmit information related to an application being executed to the electronic device 1603 in operation 1625.

If the user alternately carries or wears the electronic devices (e.g., the wearable electronic device and the portable electronic device), information of an application being executed according to a state change may be transmitted to another electronic device, thereby continuously providing an information service. For example, if an entity of executing an application is changed from a first electronic device to a second electronic device, the first electronic device may provide a related service continuously to the user by delivering information being processed to the second electronic device (or at the request of another terminal). For example, while performing a specific operation by using a mobile phone, if the mobile phone is not carried and an exercise is started by wearing a wearable electronic device, user's activity information processed in the mobile phone may be delivered to the wearable electronic device at a time of determining that the state of the mobile phone is a not-carry state and the state of the wearable electronic device is the wear state 505. Then, the information processed in the mobile phone may be received via the wearable electronic device, and the user may confirm activity information of the user continuously via the wearable electronic device.

In general, in case of GPS or Wi-Fi, a relatively great amount of current may be consumed to obtain information for one time. If an electronic device having the GPS or Wi-Fi function utilizes information of the not-carry state 501/carry state 503/wear state 505, the electronic device may compulsorily end driving of a sensor upon occurrence of the not-carry state 501 even if GPS, Wi-Fi, or another sensor starts to be driven by a user. In addition, upon transitioning from the not-carry state 501 to the carry state 503 or the wear state 505, the electronic device may restart the sensor. However, the electronic device may minimize an amount of current consumed in the terminal due to driving of the sensor in a situation where one or more sensors are driven.

Further, the electronic device may effectively give an alert (e.g., a call alert sound, a message ringtone, a schedule alarm, and the like) according to a state of the electronic device. For example, when the electronic device is in the not-carry state 501, the alert may be given to the user through a sound. When the electronic device is in the carry state 503, the alert may be given to the user through a sound and a vibration. When the electronic device is in the wear state 505, the alert may be given to the user through the vibration. Therefore, since the electronic device can properly give the alert according to the state, it is possible to minimize a situation in which the user cannot receive the alert for generated information at a proper time.

Further, if a wearable electronic device is determined as the carry state 503, even though the same sensor data is measured as a motion of wearing the electronic device (e.g., a wrist-up motion in case of a watch-type electronic device), unnecessary current consumption of the electronic device can be minimized by not turning a display on according to the motion (e.g., the wrist-up) operation.

Methods based on the embodiments disclosed in the claims and/or specification of the present disclosure may be implemented in hardware, software, or a combination of hardware and software.

When implemented in software, a computer readable recording medium for storing one or more programs (software modules) may be provided. The one or more programs stored in the computer readable recording medium are configured for execution performed by one or more processors in an electronic device. The one or more programs include instructions for allowing the electronic device to execute the methods based on the embodiments disclosed in the claims or specification of the present disclosure.

The program (software module or software) may be stored in a random access memory, a non-volatile memory including a flash memory, a ROM, an EEPROM, a magnetic disc storage device, a CD-ROM, DVDs or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network, such as the Internet, an Intranet, a LAN, a wide LAN (WLAN), or a storage area network (SAN) or a communication network configured by combining the networks. The storage device may access via an external port to the apparatus performing the various embodiments of the present disclosure. In addition, a separate storage device on the communication network may access the apparatus performing the various embodiments of the present disclosure.

In the various embodiments of the present disclosure described above, the elements included in an embodiment of the present disclosure are expressed in a singular form or a plural form according to an embodiment. However, the singular form or plural form is just selected to suit to a suggested situation for the sake of easy explanation, and the present disclosure is not limited to the single or plural elements. Even when an element is expressed in a plural form, the element may be provided as a single element, and, even when an element is expressed in a singular form, the element may be provided as a plurality of elements.

According to various embodiments of the present disclosure, an electronic device first determines a not-carry/carry state of the electronic device by using a first sensor having a small amount of current consumption, and determines a carry/wear state of the terminal by using a second sensor having a relatively great amount of current consumption in comparison with the first sensor in the carry state. Therefore, current consumption of the electronic device can be decreased, and thus a usage time of the electronic device can be extended. Further, if a motion of the electronic device occurs in a pre-defined type in the carry state, whether it is worn is determined by activating the second sensor, thereby being able to decrease current consumption caused by the second sensor having a relatively great amount of current consumption.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating a wearable device, the method comprising:
    obtaining, by at least one processor, first state information related to a motion of the wearable device by using a first sensor operatively coupled to the at least one processor while the wearable device is in a first state, the first state indicating the wearable device is stationary;
    transitioning, by the at least one processor, if the first state information satisfies a first designated condition, the wearable device from the first state to a second state, the second state indicating the wearable device is moving with a user without being worn by the user, wherein the first state information satisfies the first designated condition, if a value for the motion above a specific value is maintained for a time longer than a time duration;
    obtaining, by the at least one processor, second state information related to a distance between at least a part of a body of a user and the wearable device by using a second sensor operatively coupled to the at least one processor while the wearable device is in the second state;

transitioning, by the at least one processor, if the second state information satisfies a second designated condition, the wearable device from the second state to a third state, the third state indicating the wearable device is worn by the user or authenticated by the user; and transitioning, by the at least one processor, if a value for the motion below the specific value is maintained for a time longer than a set time, the wearable device from the second state to the first state.

2. The method of claim 1, wherein the transitioning to the second state comprises activating the second sensor.

3. The method of claim 1, wherein the obtaining of the second state information comprises obtaining a distance or biometric information of the user by using the second sensor.

4. The method of claim 1,
wherein the obtaining of the second state information comprises:
activating, by the at least one processor, the second sensor upon recognizing a pre-set motion in the first sensor while the wearable device is in the second state; and
obtaining, by the at least one processor, the second state information by using the activated second sensor, and
wherein the transitioning to the third state further comprises, if the second state information satisfies the second designated condition, transitioning the wearable device from the second state to the third state, and deactivating the second sensor.

5. The method of claim 4, further comprising:
activating, by the at least one processor, upon recognizing the pre-set motion in the first sensor while the wearable device is in the third state, the second sensor;
obtaining, by the at least one processor, the second state information by using the activated second sensor; and
deactivating, by the at least one processor, if the second state information does not satisfy the second designated condition, the second sensor, and returning to the second state.

6. The method of claim 1, further comprising:
obtaining, by the at least one processor, the value for the motion of the wearable device by using the first sensor while the wearable device is in the second state.

7. The method of claim 1, comprising:
transitioning, by the at least one processor, the wearable device from the second state to the third state;
executing, by the at least one processor, at least one application;
performing, by the at least one processor, an authentication procedure for the at least one application;
maintaining, by the at least one processor, authentication until the wearable device transitions from the third state to at least one of the first state or the second state; and
cancelling, by the at least one processor, the authentication if the wearable device transitions from the third state to the first state or the second state.

8. The method of claim 1, further comprising:
confirming, by the at least one processor, location information of the wearable device if the wearable device is in the first state; and
transmitting, by a transceiver, the location information to at least one different wearable device connected with the wearable device by using at least one communication scheme, based on a comparison result of the confirmed location information and pre-registered location information.

9. The method of claim 1, further comprising:
transmitting, by a transceiver, information processed in the second state or the third state to a different wearable device when the wearable device transitions to the first state; and
requesting, by the at least one processor, the different wearable device to transmit information if the wearable device transitions to the third state, and continuously providing a service of information executed in the different wearable device by using received information.

10. A wearable device comprising:
a memory configured to store a first designated condition and a second designated condition corresponding to states of the wearable device; and
at least one processor configured to:
obtain first state information related to a motion of the wearable device by using a first sensor operatively coupled to the at least one processor while the wearable device is in a first state, the first state indicating the wearable device is stationary,
if the first state information satisfies the first designated condition, transition the wearable device from the first state to a second state, the second state indicating the wearable device is moving with a user without being worn by the user, wherein the first state information satisfies the first designated condition, if a value for the motion above a specific value is maintained for a time longer than a time duration,
obtain second state information related to a distance between at least a part of a body of a user and the wearable device by using a second sensor operatively coupled to the at least one processor while the wearable device is in the second state,
if the second state information satisfies the second designated condition, transition the wearable device from the second state to a third state, the third state indicating the wearable device is worn by the user or authenticated by the user, and
if a value for the motion below the specific value is maintained for a time longer than a set time, transition the wearable device from the second state to the first state.

11. The wearable device of claim 10, wherein the at least one processor is further configured to activate the second sensor upon transitioning to the second state.

12. The wearable device of claim 10, wherein the at least one processor is further configured to perform an authentication procedure based on the second state information.

13. The wearable device of claim 10, wherein the at least one processor is further configured to obtain a distance or the user's biometric information by using the second sensor.

14. The wearable device of claim 10, wherein the at least one processor is further configured to:
activate the second sensor upon recognizing a pre-set motion in the first sensor while the wearable device is in the second state,
obtain the second state information by using the activated second sensor, and
transition, if the second state information satisfies the second designated condition, the wearable device from the second state to the third state, and deactivate the second sensor.

15. The wearable device of claim 14, wherein the at least one processor is further configured to:
  activate the second sensor upon recognizing the pre-set motion in the first sensor while the wearable device is in the third state,
  obtain the second state information by using the activated second sensor if the second state information does not satisfy the second designated condition,
  deactivate the second sensor, and
  return to the second state.

16. The wearable device of claim 10, wherein the at least one processor is further configured to:
  obtain the first state information related to the motion of the wearable device by using the first sensor operatively while the wearable device is in the second state.

17. At least one non-transitory computer-readable storage medium configured to store one or more computer programs including instructions that, when executed by at least one processor, cause the at least one processor to control to:
  obtain first state information related to a motion of a wearable device by using a first sensor operatively coupled to the at least one processor while the wearable device is in a first state, the first state indicating the wearable device is stationary;
  if the first state information satisfies a first designated condition, transition the wearable device from the first state to a second state, the second state indicating the wearable device is moving with a user without being worn by the user, wherein the first state information satisfies the first designated condition, if a value for the motion above a specific value is maintained for a time longer than a time duration;
  obtain second state information related to a distance between at least a part of a body of a user and the wearable device by using a second sensor operatively coupled to the at least one processor while the wearable device is in the second state;
  if the second state information satisfies a second designated condition, transition the wearable device from the second state to a third state, the third state indicating the wearable device is worn by the user or authenticated by the user; and
  if a value for the motion below the specific value is maintained for a time longer than a set time, transition the wearable device from the second state to the first state.

18. The method of claim 1, further comprising:
  transmitting, by the wearable device to another wearable device, if the wearable device transitions to the first state, location information of the wearable device.

19. The method of claim 1, further comprising:
  transmitting, by the wearable device to another wearable device, if the wearable device transitions to the third state, a request for information from the other wearable device;
  receiving, by the wearable device from the other wearable device, the information from the other wearable device; and
  in response to receiving the information, opening an application corresponding to the information.

* * * * *